(12) United States Patent
Osawa

(10) Patent No.: US 7,894,715 B2
(45) Date of Patent: Feb. 22, 2011

(54) IMAGE PICKUP APPARATUS, CAMERA SYSTEM, AND CONTROL METHOD FOR IMAGE PICKUP APPARATUS

(75) Inventor: Toshifumi Osawa, Tokyo (JP)

(73) Assignee: Canon Kabushiki Kaisha (JP)

( * ) Notice: Subject to any disclaimer, the term of this patent is extended or adjusted under 35 U.S.C. 154(b) by 159 days.

(21) Appl. No.: 12/414,062

(22) Filed: Mar. 30, 2009

(65) Prior Publication Data
US 2009/0245775 A1 Oct. 1, 2009

(30) Foreign Application Priority Data
Mar. 31, 2008 (JP) ............... 2008-092364
Mar. 31, 2008 (JP) ............... 2008-092366

(51) Int. Cl.
G03B 15/05 (2006.01)
(52) U.S. Cl. ............ 396/61; 396/157; 396/159
(58) Field of Classification Search .......... 396/61, 396/157, 159–163
See application file for complete search history.

(56) References Cited

U.S. PATENT DOCUMENTS

| | | | |
|---|---|---|---|
| 7,254,321 B2 | 8/2007 | Tokunaga | |
| 7,706,674 B2* | 4/2010 | Sugimoto et al. | 396/61 |
| 7,801,436 B2* | 9/2010 | Kobayashi | 396/157 |
| 7,813,635 B2* | 10/2010 | Tamura | 396/155 |
| 2006/0044422 A1* | 3/2006 | Miyazaki | 348/234 |
| 2008/0193119 A1* | 8/2008 | Miyazaki | 396/157 |

FOREIGN PATENT DOCUMENTS

| | | |
|---|---|---|
| JP | 2003-75717 A | 3/2003 |
| JP | 2005-184508 A | 7/2005 |
| JP | 2005-275265 A | 10/2005 |

\* cited by examiner

Primary Examiner—W. B. Perkey
(74) Attorney, Agent, or Firm—Rossi, Kimms & McDowell LLP

(57) ABSTRACT

An image pickup apparatus capable of executing photographing using an emission unit that emits light to a subject includes an acquisition unit for obtaining distance-to-subject information based on lens driving information on a taking lens obtained upon focus adjustment, a detection unit for detecting a face of the subject based on an image signal obtained upon image pickup, a distance calculation unit for calculating a distance to subject based on a result of detection by the detection unit, and an emission amount calculation unit for calculating an amount of main emission of the emission unit based on the distance-to-subject information obtained by the acquisition unit and the distance to subject calculated by the distance calculation unit.

20 Claims, 13 Drawing Sheets

FIG.8

| FOCAL DISTANCE (f) | LVL0 |
|---|---|
| f＜40mm | STANDARD REFLECTION BRIGHTNESS AT 0.5 m |
| 40mm≦f＜75mm | STANDARD REFLECTION BRIGHTNESS AT 0.8 m |
| 75mm≦f＜100mm | STANDARD REFLECTION BRIGHTNESS AT 1.1 m |
| 100mm≦f | STANDARD REFLECTION BRIGHTNESS AT 1.4 m |

FIG.9A
| K(1) | K(2) | K(3) | K(4) | K(5) | K(6) | K(7) |
|---|---|---|---|---|---|---|
| K(8) | K(9) | K(10) | K(11) | K(12) | K(13) | K(14) |
| K(15) | K(16) | K(17) | K(18) | K(19) | K(20) | K(21) |
| K(22) | K(23) | K(24) | K(25) | K(26) | K(27) | K(28) |
| K(29) | K(30) | K(31) | K(32) | K(33) | K(34) | K(35) |
FIG.9D
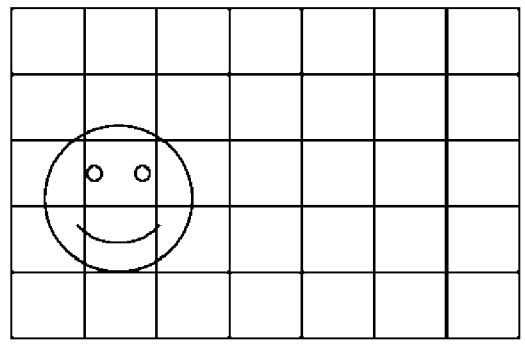
FIG.9B
| 0 | 0 | 0 | 0 | 0 | 0 | 0 |
|---|---|---|---|---|---|---|
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |
FIG.9E
| 0 | 0 | 0 | 0 | 0 | 0 | 0 |
|---|---|---|---|---|---|---|
| 1 | 1 | 1 | 1 | 1 | 1 | 0 |
| 1 | 1 | 1 | 1 | 1 | 1 | 0 |
| 1 | 1 | 1 | 1 | 1 | 1 | 0 |
| 1 | 1 | 1 | 1 | 1 | 1 | 0 |
FIG.9C
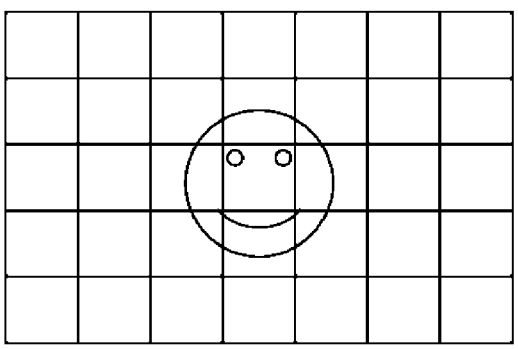
FIG.9F
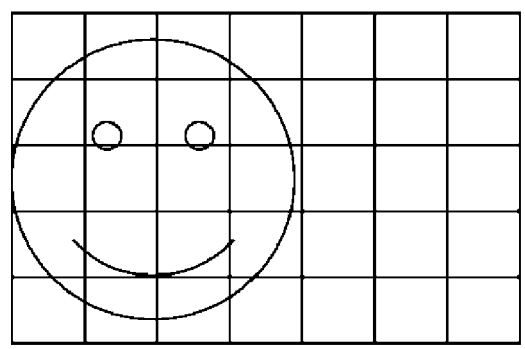

FIG.10

| RR(i) | W(i) |
|---|---|
| RR(i)<-2 | 1 |
| -2≦RR(i)<-0.5 | 5 |
| -0.5≦RR(i)<0 | 10 |
| 0≦RR(i)<0.2 | 12 |
| 0.2≦RR(i)<0.4 | 11 |
| 0.4≦RR(i)<0.6 | 10 |
| 0.6≦RR(i)<0.8 | 8 |
| 0.8≦RR(i)<1.0 | 6 |
| 1.0≦RR(i)<1.5 | 4 |
| 1.5≦RR(i)<2.0 | 2 |
| 2.0≦RR(i) | 0 |

FIG.11A

| 0 | 0 | 0 | 0 | 0 | 0 | 0 |
|---|---|---|---|---|---|---|
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |

FIG.11B

| 0 | 0 | 0 | 0 | 0 | 0 | 0 |
|---|---|---|---|---|---|---|
| 1 | 1 | 1 | 1 | 1 | 0 | 0 |
| 1 | 1 | 1 | 1 | 1 | 0 | 0 |
| 1 | 1 | 1 | 1 | 1 | 0 | 0 |
| 1 | 1 | 1 | 1 | 1 | 0 | 0 |

FIG.11C

| 0 | 0 | 0 | 0 | 0 | 0 | 0 |
|---|---|---|---|---|---|---|
| 0 | 0 | 1 | 1 | 1 | 1 | 1 |
| 0 | 0 | 1 | 1 | 1 | 1 | 1 |
| 0 | 0 | 1 | 1 | 1 | 1 | 1 |
| 0 | 0 | 1 | 1 | 1 | 1 | 1 |

FIG.11D

| 0 | 1 | 1 | 1 | 1 | 1 | 0 |
|---|---|---|---|---|---|---|
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |
| 0 | 0 | 0 | 0 | 0 | 0 | 0 |

FIG.11E

| 0 | 1 | 1 | 1 | 1 | 1 | 0 |
|---|---|---|---|---|---|---|
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 0 | 1 | 1 | 1 | 1 | 1 | 0 |

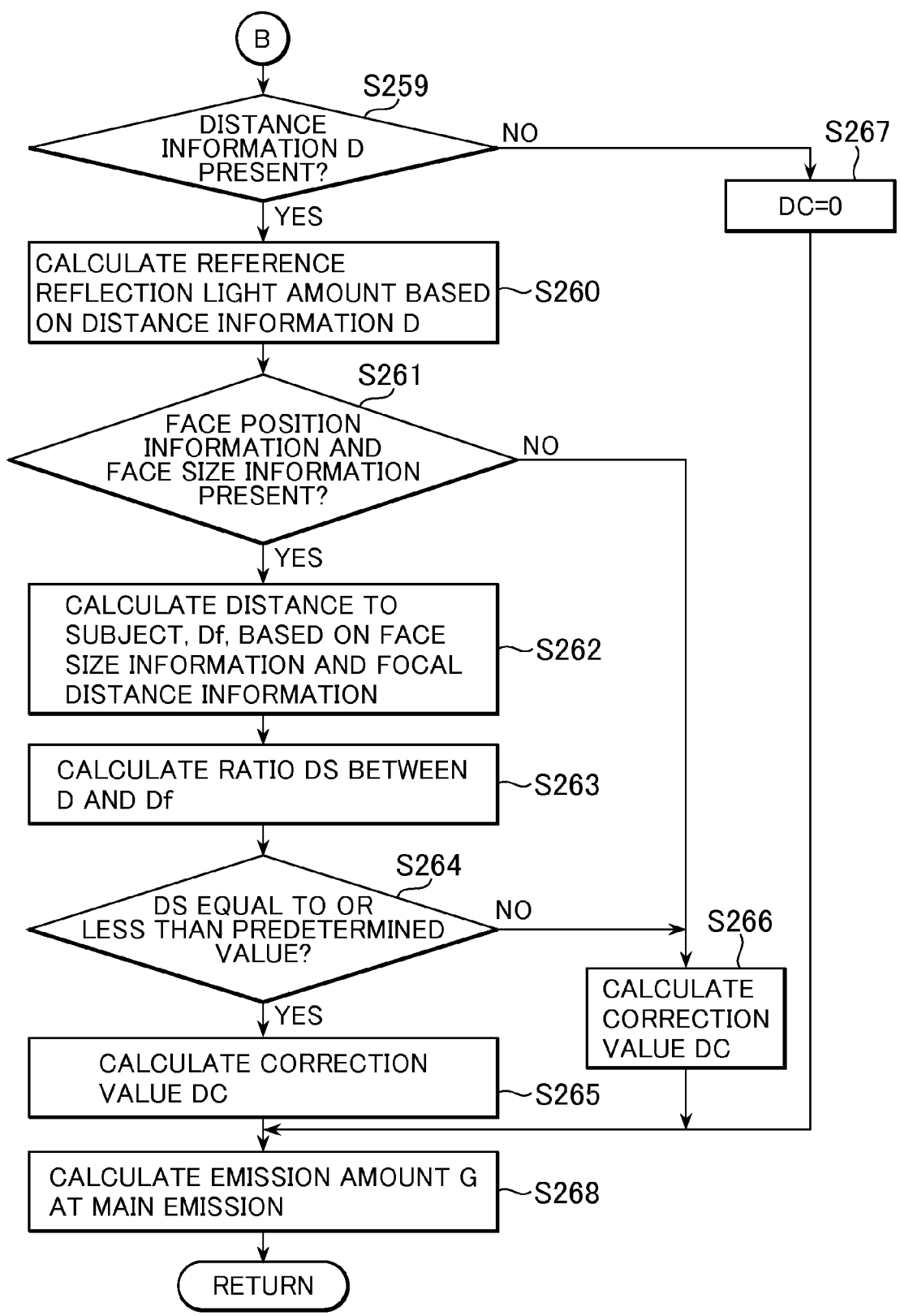

IMAGE PICKUP APPARATUS, CAMERA SYSTEM, AND CONTROL METHOD FOR IMAGE PICKUP APPARATUS

BACKGROUND OF THE INVENTION

1. Field of the Invention

The present invention relates to an image pickup apparatus capable of executing flash-photographing, a camera system, and a control method for the image pickup apparatus.

2. Description of the Related Art

Conventionally, various techniques have been proposed for flash-emission control of image pickup apparatuses (such as a camera and a digital still camera) at flash-photographing. Among these, there are many proposals to perform preliminary light emission of a flash prior to an exposure operation and photometrically measure reflection light from a subject at the preliminary light emission for each of divided regions of an imaging screen (a subject image observed through a finder or a display), thereby deciding an amount of main flash. This is because an amount of light emission for various photographing scenes can properly be decided by deciding the amount of main flash in accordance with predetermined algorithm based on the result of photometric measurement on the divided regions.

With regard to the flash-emission control, an image pickup method has been proposed to stably obtain an appropriate amount of exposure (for example, Japanese Laid-open Patent Publication No. 2005-275265). In this method, a ratio $R(i)$ between light metering values $P(i)$ and $H(i)$ immediately before and during preliminary light emission is calculated for each of light metering areas. Then, a maximum ratio among the calculated ratios $R(i)$ is extracted as a reference value baseR, and a value of $R(i)$ for each light metering area is compared with the reference value baseR to thereby decide a weighting coefficient $W(i)$ for each light metering area. Next, amounts of reflection light received by respective ones of the light metering areas at the preliminary light emission are weight-averaged using the weighting coefficients $W(i)$ to thereby obtain a weighted average of the amounts of reflection light at the preliminary light emission, and an amount of main flash is calculated based on the obtained weighted average.

An image pickup method has also been proposed for detecting a human face region to attain a satisfactory exposure, even if subject brightness is insufficient (see, for example, Japanese Laid-open Patent Publication No. 2005-184508). In this method, it is detected whether or not there is a human face region in an image picked up at preliminary flash emission. Next, a light control region is decided based on the detected face region, and an amount of main flash is calculated based on a light metering value in the light control region at the preliminary light emission.

Also, an image pickup method for flash-emission control has been proposed (see, for example, Japanese Laid-open Patent Publication No. 2003-075717). In this method, a predetermined subject image (specifically, a human face) is extracted from an image pickup signal obtained upon image pickup of the subject, and a distance to subject is calculated based on the size of the extracted subject image. The calculated result is used for flash-emission control, etc.

With the technique disclosed in Japanese Laid-open Patent Publication No. 2005-275265, it is possible to attain a stable exposure at many photographing scenes and reduce a change in exposure in a case that the composition is slightly changed, with the photographing scene remaining the same. In this technique, a light metering area having a maximum ratio among ratios $R(i)$ for light metering areas that empirically satisfy a predetermined condition is regarded as a main subject area, and $R(i)$ of such area is extracted as a reference value baseR and used for decision of weighting coefficients $W(i)$ and calculation of an amount of main emission. On the other hand, a large weighting coefficient $W(i)$ tends to be assigned to a light metering area corresponding to a subject located at close distance or having a high reflectance. Therefore, if a light metering area corresponding to a true main subject does not satisfy the predetermined condition, the weighting coefficients $W(i)$ and the amount of main emission become inappropriate, and the exposure intended by the photographer cannot be provided.

With the technique disclosed in Japanese Laid-open Patent Publication No. 2005-275265, an amount of main flash is calculated based on an amount of reflection light from the subject at preliminary light emission. Thus, if the subject has a high or low reflectance, weighting coefficients $W(i)$ dependent on the reflectance of the subject and the amount of main emission become inappropriate. Thus, the resultant exposure can be deviated from a preferred exposure in some cases.

With the technique disclosed in Japanese Laid-open Patent Publication No. 2005-184508, a satisfactory exposure can be obtained with high possibility in a case that a main subject is a human and a human face is reliably detected. However, if the resolution of a sensor used for photometric measurement of reflection light at preliminary light emission is inadequate for the size of a face region in the imaging screen, a problem is posed that when an attempt is made to select the face region as the light control region for determination of the amount of main flash, influences of a background around the human subject or other regions cannot be removed, sometimes resulting in inappropriate exposure.

With the technique disclosed in Japanese Laid-open Patent Publication No. 2003-075717, it is highly possible to attain a satisfactory exposure not dependent on the reflectance of the subject by calculating a photographing distance to subject based on the size of the subject's face and deciding an amount of emission according to the calculated distance. In the case of flash-photographing, it is generally possible to calculate the required amount of flash emission based on distance-to-subject information and a diaphragm value for photographing, if accurate distance-to-subject information is obtainable. Since the thus calculated amount of flash emission provides information not dependent on the reflectance of the subject, it is preferable to obtain the distance-to-subject information.

With most of the state-of-art technologies, however, even a face image, etc. printed on a poster or other printed material is detected as a human's face. Since the size of the face image on a printed material does not necessarily coincide with the size of an actual face, it is highly possible that a photographing distance calculated from the subject size has a large error, resulting in unsatisfactory exposure at the time of photographing.

There is an idea to obtain the distance-to-subject information by use of an auto-focus mechanism of a camera or the like. However, the auto-focus mechanism has a detection error in distance measurement depending on various conditions. In addition, there is a production error in a distance encoder that provides information on the position of a distance ring of a taking lens. Thus, a problem is posed that it is difficult to determine whether or not the obtained distanceto-subject information includes a small error or a large error relative to the actual distance to subject.

SUMMARY OF THE INVENTION

The present invention provides an image pickup apparatus capable of increasing the possibility of realizing an exposure intended by a photographer, and provides a camera system and a control method for the image pickup apparatus.

The present invention also provides an image pickup apparatus capable of attaining a satisfactory exposure not dependent on subject reflectance and attaining a stable exposure with less affection by an error in emission amount, and provides a camera system and a control method for the image pickup apparatus.

According to a first aspect of this invention, there is provided an image pickup apparatus capable of executing photographing using an emission unit that emits light to a subject, which comprises an acquisition unit adapted to obtain distance-to-subject information based on lens driving information on a taking lens obtained upon focus adjustment, a detection unit adapted to detect a face of the subject based on an image signal obtained upon image pickup, a distance calculation unit adapted to calculate a distance to subject based on a result of detection by the detection unit, and an emission amount calculation unit adapted to calculate an amount of main emission of the emission unit based on the distance-to-subject information obtained by the acquisition unit and the distance to subject calculated by the distance calculation unit.

According to a second aspect of this invention, there is provided an image pickup apparatus capable of executing photographing using an emission unit that emits light to a subject, which comprises a light metering unit having a plurality of divided light metering regions and adapted to photometrically measure subject brightness for each of the light metering regions, a detection unit adapted to detect a face of the subject based on an image signal obtained upon image pickup, a brightness ratio calculation unit adapted to calculate, for each of the light metering regions, a ratio between first brightness photometrically measured by the light metering unit before a preliminary emission operation of the emission unit and second brightness photometrically measured by the light metering unit during the preliminary emission operation of the emission unit, an extraction unit adapted to extract a value of a reference ratio from ratios calculated by the brightness ratio calculation unit for the light metering regions, a setting unit adapted to set, based on a result of detection by the detection unit, object light metering regions from which the value of the reference ratio is to be extracted by the extraction unit, a weighted calculation unit adapted to calculate a weighted average value of brightnesses photometrically measured by the light metering unit for the light metering regions based on results of comparison between the value of the reference ratio extracted by the extraction unit and each of values of ratios calculated by the brightness ratio calculation unit for the light metering regions, and an emission amount calculation unit adapted to calculate an amount of main emission of the emission unit based on the weighted average value calculated by the weighted calculation unit.

According to a third aspect of this invention, there is provided a camera system capable of executing strobe photographing, which comprises a lens unit, an emission unit adapted to emit light to a subject, an acquisition unit adapted to obtain distance-to-subject information based on lens driving information on a taking lens obtained upon focus adjustment of the lens unit, a detection unit adapted to detect a face of the subject based on an image signal obtained upon image pickup, a distance calculation unit adapted to calculate a distance to subject based on a result of detection by the detection unit, and an emission amount calculation unit adapted to calculate an amount of main emission of the emission unit based on the distance-to-subject information obtained by the acquisition unit and the distance to subject calculated by the distance calculation unit.

According to a fourth aspect of this invention, there is provided a camera system capable of executing strobe photographing, which comprises an emission unit adapted to emit light to a subject, a light metering unit having a plurality of divided light metering regions and adapted to photometrically measure brightness of the subject for each of the light metering regions, a detection unit adapted to detect a face of the subject based on an image signal obtained upon image pickup, a brightness ratio calculation unit adapted to calculate, for each light metering region, a ratio between first brightness photometrically measured by the light metering unit before a preliminary emission operation of the emission unit and second brightness photometrically measured by the light metering unit during the preliminary emission operation of the emission unit, an extraction unit adapted to extract a value of a reference ratio from ratios calculated by the brightness ratio calculation unit for the light metering regions, a setting unit adapted to set, based on a result of detection by the detection unit, object light metering regions from which the value of the reference ratio is to be extracted by the extraction unit, a weighted calculation unit adapted to calculate a weighted average value of brightnesses photometrically measured by the light metering unit for the light metering regions based on results of comparison between the value of the reference ratio extracted by the extraction unit and each of values of ratios calculated by the brightness ratio calculation unit for the light metering regions, and an emission amount calculation unit adapted to calculate an amount of main emission of the emission unit based on the weighted average value calculated by the weighted calculation unit.

According to a fifth aspect of this invention, there is provided a control method for an image pickup apparatus capable of executing photographing using an emission unit that emits light to a subject, which comprises an acquisition step of obtaining distance-to-subject information based on lens driving information on a taking lens obtained upon focus adjustment, a detection step of detecting a face of the subject based on an image signal obtained upon image pickup, a distance calculation step of calculating a distance to subject based on a result of detection in the detection step, and an emission amount calculation step of calculating an amount of main emission of the emission unit based on the distance-to-subject information obtained in the acquisition step and the distance to subject calculated in the distance calculation step.

According to a sixth aspect of this invention, there is provided a control method for an image pickup apparatus capable of executing photographing using an emission unit that emits light to a subject, which comprises a light metering step of photometrically measuring subject brightness for each of a plurality of divided light metering regions, a detection step of detecting a face of the subject based on an image signal obtained upon image pickup, a brightness ratio calculation step of calculating, for each of the light metering regions, a ratio between first brightness photometrically measured in the light metering step before a preliminary emission operation of the emission unit and second brightness photometrically measured in the light metering step during the preliminary emission operation of the emission unit, an extraction step of extracting a value of a reference ratio from ratios calculated in the brightness ratio calculation step for the light metering regions, a setting step of setting, based on a result of detection in the detection step, object light metering regions from which a value of the reference ratio is to be extracted in the extraction step, a weighted calculation step of calculating a weighted average value of brightnesses photometrically measured in the light metering step for the light metering regions based on results of comparison between the value of the reference ratio extracted in the extraction step and each of values of ratios calculated in the brightness ratio calculation step for the light metering regions, and an emission amount calculation step of calculating an amount of main emission of the emission unit based on the weighted average value calculated in the weighted calculation step.

Further features of the present invention will become apparent from the following description of exemplary embodiments with reference to the attached drawings.

BRIEF DESCRIPTION OF THE DRAWINGS

FIG. 8 is a view showing an example LVL0 determination table;

FIGS. 9A to 9F are views showing K(i) values;

FIG. 10 is a view showing an example W(i) value determination table;

FIG. 11A to E are views showing examples of a setting combination table for coefficients K(i) according to a second embodiment of this invention, the coefficients K(i) being used for restricting option areas from which a reference value BaseR should be selected;

FIG. 12B is the remaining part of the flowchart following FIG. 12A.

DETAILED DESCRIPTION OF THE PREFERRED EMBODIMENTS

The present invention will now be described in detail below with reference to the drawings showing preferred embodiments thereof.

First Embodiment

Figure 1:
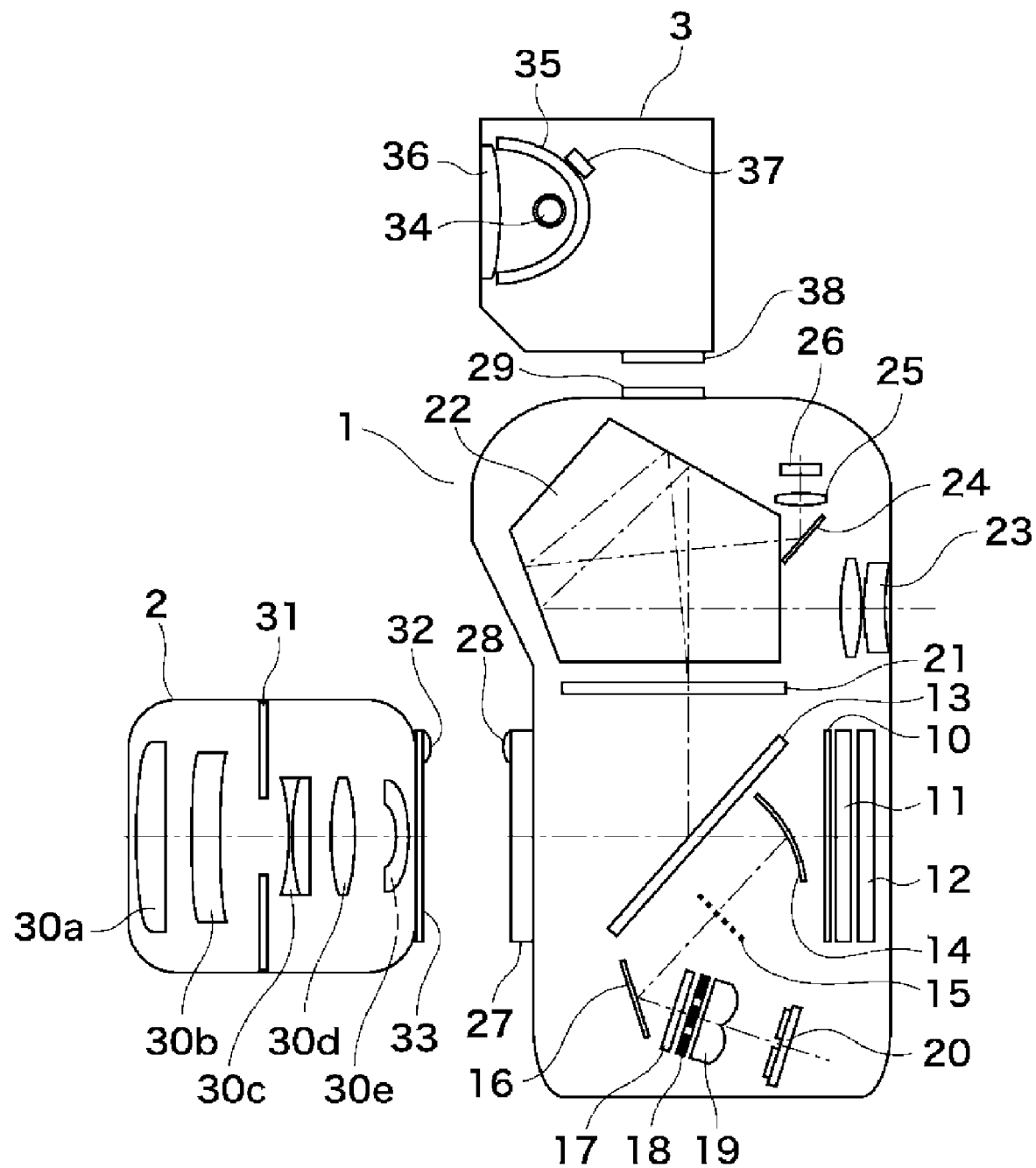
FIG. 1 is a schematic view showing the internal construction of a camera system comprised of a camera body, as an image pickup apparatus according to a first embodiment of this invention, a lens unit, and a flash unit.

FIG. 1 shows the internal construction of a camera system comprised of a camera body, as an image pickup apparatus according to a first embodiment of this invention, a lens unit, and a flash unit.

Referring to FIG. 1, the camera system is of a single-lens reflex type with interchangeable lenses, in which the lens unit 2 and the flash unit 3 are removably mounted to the camera body 1. The camera body 1 includes a mechanical shutter (hereinafter referred to as the shutter) 10, a low-pass filter 11, an image pickup device 12, a main mirror 13, a first reflecting mirror 14, a second reflecting mirror 16, an infrared cut filter 17, and a diaphragm 18. The camera body 1 further includes a secondary image-forming lens 19, a focus-detecting sensor 20, a focusing plate 21, a pentagonal prism 22, an eyepiece lens 23, a third reflecting mirror 24, a collective lens 25, and a light metering sensor 26.

The image pickup device 12 is comprised of an area storage type photoelectric conversion device (for example, CMOS or CCD). The main mirror 13 is made of a semi-transmissive mirror. The main mirror 13 and the first reflecting mirror 14 are configured to be flipped upward by a driving mechanism (not shown) from illustrated positions during photographing. A paraxial image-forming surface 15 is an example image-forming surface, which is formed by the first reflecting mirror 14 so as to be conjugate to an imaging surface of the image pickup device 12. The diaphragm 18 has two apertures.

Figure 2:
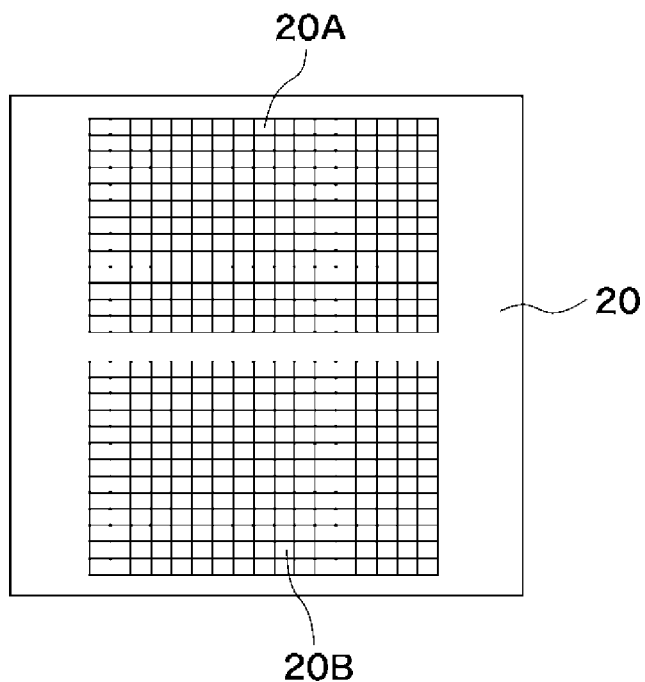
FIG. 2 is a view showing an example construction of a focus-detecting sensor of the camera.

The focus-detecting sensor 20 is comprised of an area storage type photoelectric conversion device (for example, CMOS or CCD), and includes light receiving sensor sections 20A, 20B respectively disposed in two areas, as shown in FIG. 2. The light receiving sensor sections 20A, 20B respectively correspond to the two apertures of the diaphragm 18 and are each divided into a large number of sections. The focus-detecting sensor 20 is configured as an integrated circuit in which a signal accumulation section, a signal processing peripheral circuit, etc. are formed on the same chip together with the light receiving sensor sections 20A, 20B.

The above described construction from the first reflecting mirror 14 to the focus-detecting sensor 20 makes it possible to realize focus detection at an arbitrary position in an imaging screen based on an image blurring method, as described in detail, for example, in Japanese Laid-open Patent Publication No. 9-184965.

Figure 3:
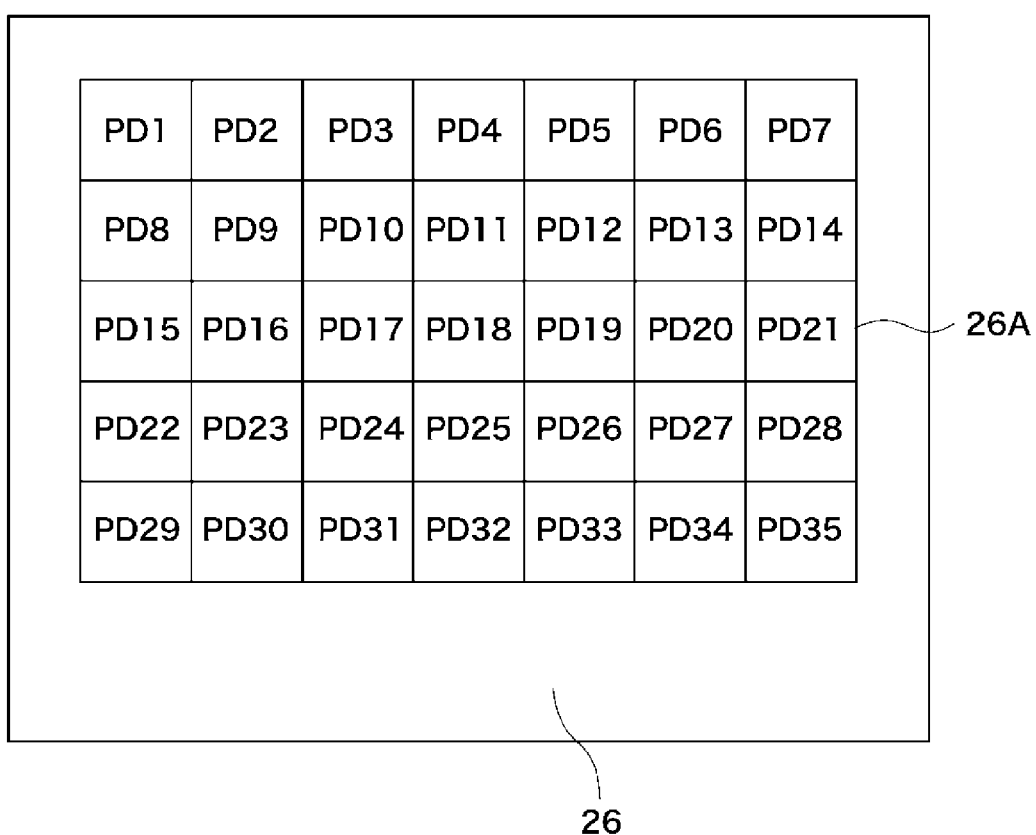
FIG. 3 is a view showing an example construction of a light metering sensor of the camera.

The light metering sensor 26 is composed of photoelectric conversion elements such as silicon photodiodes, and is for obtaining information on subject brightness. The light metering sensor 26 includes a light receiving sensor section 26A divided into lattice segments as shown in FIG. 3, and has a field of view covering substantially the entire imaging screen. In this embodiment, the light receiving field-of-view of the light receiving sensor section 26A is divided into 35 parts, i.e., 7 columns and 5 rows. Light receiving portions obtained by division into the 35 parts are referred to as PD1 to PD35. The light metering sensor 26 is configured as an integrated circuit in which a signal amplifier section, a signal processing peripheral circuit, etc. are formed on the same chip together with the light receiving sensor section 26A.

The focusing plate 21, the pentagonal prism 22, and the eyepiece lens 23 form a view finder optical system. A part (outside the optical axis) of light beams reflected by the main mirror 13 and diffused by the focusing plate 21 enters the light metering sensor 26.

Figure 4:
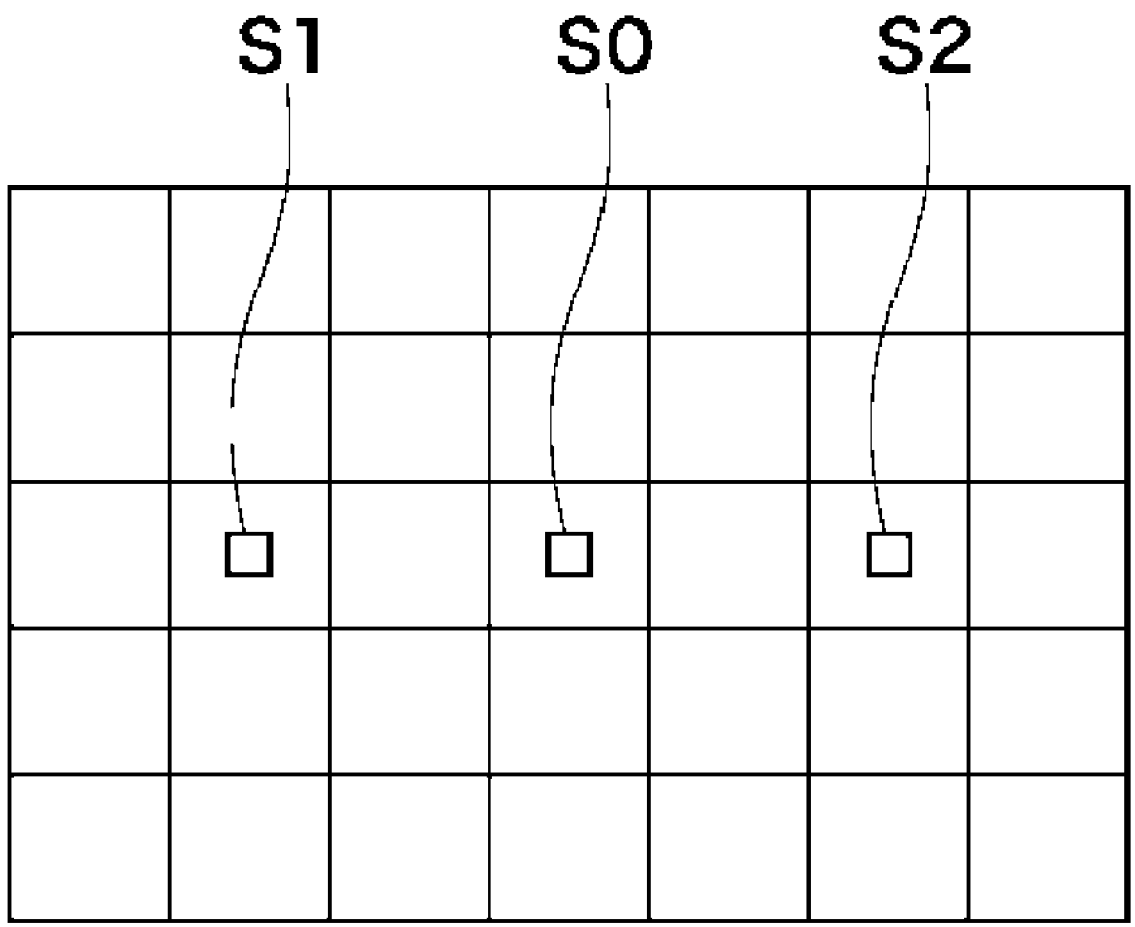
FIG. 4 is a view showing a positional correspondence relation between positions in an imaging screen subjected to focus detection by the focus-detecting sensor and 35 divided parts of the light metering sensor.

FIG. 4 shows a positional correspondence relation between positions in the imaging screen subjected to focus detection by the focus-detecting sensor 20 and the 35 split parts of the light metering sensor 26. In this embodiment, focus detection is carried out at, e.g., three focus detection positions S0 to S2 in the imaging screen. The focus detection position S0 corresponds to the light receiving portion PD18 of the light metering sensor 26, the focus detection position S1 corresponds to the light receiving portion PD16 of the sensor 26, and the focus detection position S2 corresponds to the light receiving portion PD20 of the sensor 26. The number of division, 35, into which the light receiving sensor section 26A of the sensor 26 is divided, and three focus detection positions S0 to S2 are mere examples. The number of division and the focus detection positions are not limited thereto.

Referring to FIG. 1 again, the camera body 1 includes a mounting member 27 for mounting the lens unit 2 to the camera body 1. A contact part 28 is for use in information communication between the camera body 1 and the lens unit 2. A connection member 29 is for mounting the flash unit 3 to the camera body 1.

The lens unit 2 includes optical lenses 30a to 30e constituting a taking lens, a diaphragm 31, a contact part 32 for use in information communication with the camera body 1, and a mounting member 33 for mounting the lens unit 2 to the camera body 1. The flash unit 3 includes an emission device (a xenon tube in this example) 34, a light reflector 35, a collective Fresnel lens 36, an emission amount detection sensor (monitor sensor) 37 for detecting an amount of emission of the emission device 34, and a mounting member 38 for mounting the flash unit 3 to the camera body 1.

Figure 5:
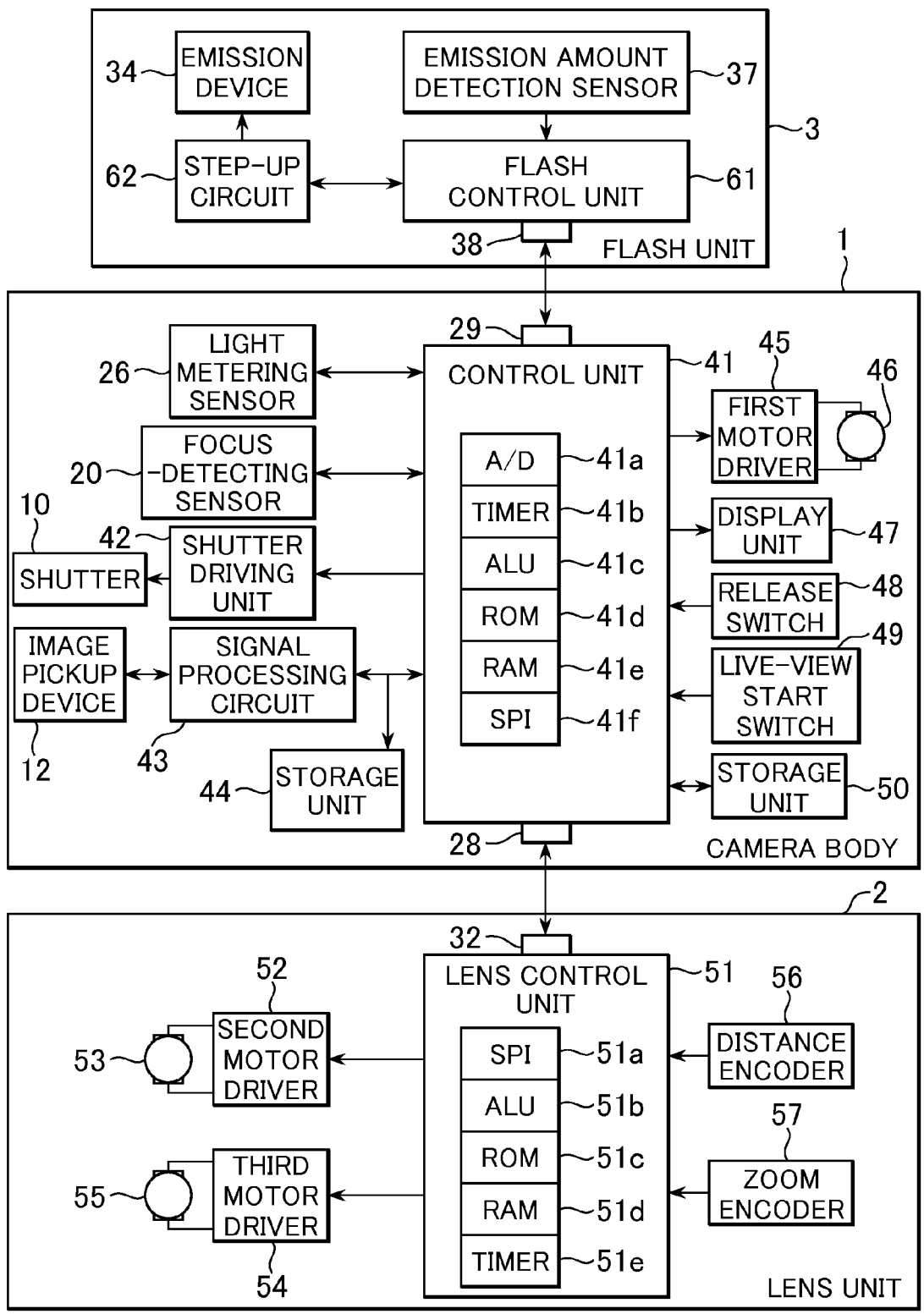
FIG. 5 is a block diagram showing an example electric circuit construction of the camera body, the lens unit, and the flash unit.

FIG. 5 shows in block diagram an example electric circuit construction of the camera body, the lens unit, and the flash unit.

As shown in FIG. 5, the camera body 1 includes a control unit 41, a shutter driving unit 42, a signal processing circuit 43, a storage unit 44, a first motor driver 45, a first motor 46, a display unit 47, a release switch 48, a live-view start switch 49, and a storage unit 50.

The control unit 41 carries out overall control of the camera. The control unit 41 is comprised of a one-chip microcomputer incorporating an A/D converter 41a, a timer 41b, an arithmetic-logic unit (ALU) 41c, a ROM 41d, a RAM 41e, a serial communication port (SPI) 41f, etc. The control unit 41 is adapted to implement processes shown in flowcharts of FIGS. 6A, 6B and 7 in accordance with programs stored in the ROM 41d. In the ROM 41d, an LVL0 determination table (FIG. 8) and a W(i) value determination table (FIG. 10), described later, are stored.

The camera body 1 includes the shutter 10, the image pickup device 12, the focus-detecting sensor 20, and the light metering sensor 26, which are already described with reference to FIG. 1, etc. Output signals from the focus-detecting sensor 20 and the light metering sensor 26 are input to input terminals of the A/D converter 41a of the control unit 41. The shutter driving unit 42 is connected to an output terminal of the control unit 41 and drives the shutter 10.

The signal processing circuit 43 controls the image pickup device 12 in accordance with instructions given by the control unit 41, inputs and A/D converts an image pickup signal output from the image pickup device 12, and performs signal processing thereon to obtain an image signal. Furthermore, the signal processing circuit 43 has a face detecting function of extracting features such as eyes and a mouth of a subject (human subject) from the obtained image signal to detect a human face, thereby obtaining face information (face position information and face size information). The signal processing circuit 43 also performs required image processing such as compression of the obtained image signal before being stored into the storage unit 50.

The storage unit 44 comprised, for example, of a DRAM is used as a work memory for signal processing by the signal processing circuit 43 and as a VRAM for displaying an image on the display unit 47. The first motor driver 45 connected to an output terminal of the control unit 41 moves upward and downward the main mirror 13 and the first reflecting mirror 14 and charges the shutter 10 to return it to its initial position under the control of the control unit 41. The display unit 47 comprised of a liquid crystal panel displays various picked-up images, etc. under the lighting control by the control unit 41.

The release switch 48 is operated by an operator during photographing. The live-view start switch 49 is operated to start a live-view function (i.e., a function of confirming the composition and performing focusing while displaying on the display unit 47 realtime a through image picked up by the image pickup device 12). The storage unit 50 is comprised, for example, of a flush memory or an optical disk, and stores picked-up image signals.

The contact part 28 adapted to be in contact with the contact part 32 of the lens unit 2 receives and supplies input/output signals passing through the serial communication port 41f of the control unit 41, whereby information communication is realized between the camera body 1 and the lens unit 2. The connection member 29 adapted to be connected to the connection part 38 of the flash unit 3 receives and supplies input/output signals passing through the serial communication port 41f of the control unit 41, whereby information communication between the camera body 1 and the flash unit 3 is made possible.

The lens unit 2 includes a lens control unit 51, a second motor driver 52, a second motor 53, a third motor driver 54, a third motor 55, a distance encoder 56, and a zoom encoder 57. The lens control unit 51 is comprised of a one-chip microcomputer in which a serial communication port (SPI) 51a, an arithmetic-logic unit (ALU) 51b, a ROM 51c, a RAM 51d, a timer 51e, etc. are incorporated.

The second motor driver 52 connected to an output terminal of the lens control unit 51 drives the second motor 53 for focus adjustment under the control of the lens control unit 51. The third motor driver 54 connected to an output terminal of the lens control unit 51 drives the third motor 55 for control of the diaphragm 31 under the control of the lens control unit 51.

The distance encoder 56 connected to an input terminal of the lens control unit 51 measures an amount of thrust of a focus adjustment lens in the lens unit 2, i.e., information on distance to subject. More specifically, the distance encoder 56 measures an amount of thrust of the focus adjustment lens in the lens unit 2 (i.e., a driving amount of the taking lens upon focus adjustment) or measures a stop position of the focus adjustment lens after the focus adjustment, and then outputs lens driving information on the measurement result. By obtaining the lens driving information from the distance encoder 56, it is possible to obtain information on an absolute distance to subject after focus adjustment. In the case of an encoder of a type outputting a relative driving amount of the focus adjustment lens, an encoder output does not provide information on absolute distance, but the relative driving amount can be converted into information on absolute distance, if a certain reference position such as infinite end is provided. The zoom encoder 57 connected to an input terminal of the lens control unit 51 measures a focal distance at photographing in a case that the lens unit 2 is a zoom lens, and obtains focal distance information. The contact part 32 receives and supplies input/output signals passing through the serial communication port 51a of the lens control unit 51.

When the lens unit 2 is mounted to the camera body 1, their contact parts 32, 28 are connected together, and as a result, data communication between the lens control unit 51 of the lens unit 2 and the control unit 41 of the camera body 1 is made possible. Information required by the control unit 41 of the camera body 1 is output by data communication from the lens control unit 51 to the control unit 41. The information includes optical information proper to the lens and required for focus detection and exposure calculation, information on distance to subject measured by the distance encoder 56, and focal distance information measured by the zoom encoder 57.

Information processed by the control unit 41 of the camera body 1 is output by data communication from the control unit 41 to the lens control unit 51. The information includes focus control information obtained by focus detection and exposure calculation by the control unit 41, and diaphragm information. The lens control unit 51 controls the second motor driver 52 in accordance with the focus control information output from the control unit 41 of the camera body 1, and controls the third motor driver 54 in accordance with the diaphragm information.

The flash unit 3 includes a flash control unit 61 and a step-up circuit 62 in addition to the emission device 34 and the emission amount detection sensor 37 which are already described and illustrated in FIG. 1. The flash control unit 61 is comprised of a one-chip microcomputer in which an arithmetic-logic unit (ALU), a ROM, a RAM, an A/D converter, a serial communication port (SPI), etc. (none of which are illustrated) are incorporated. The step-up circuit 62 has a function of producing a high voltage of about 300 V required for emission by the emission device 34 and performing charging using the produced high voltage.

When the flash unit 3 is mounted to the camera body 1, the connection part 38 and the connection member 29 are connected together, and as a result, the flash control unit 61 of the flash unit 3 is able to make data communication with the control unit 41 of the camera body 1. The flash control unit 61 controls the step-up circuit 62 in accordance with communication content supplied from the control unit 41 of the camera body 1 to thereby start and stop the emission by the emission device 34, and outputs an amount of detection by the emission amount detection sensor 37 to the control unit 41 of the camera body 1.

In the following, an operation of the camera of this embodiment having the above described construction is described with reference to FIGS. 6A to 10.

Figure 6A:
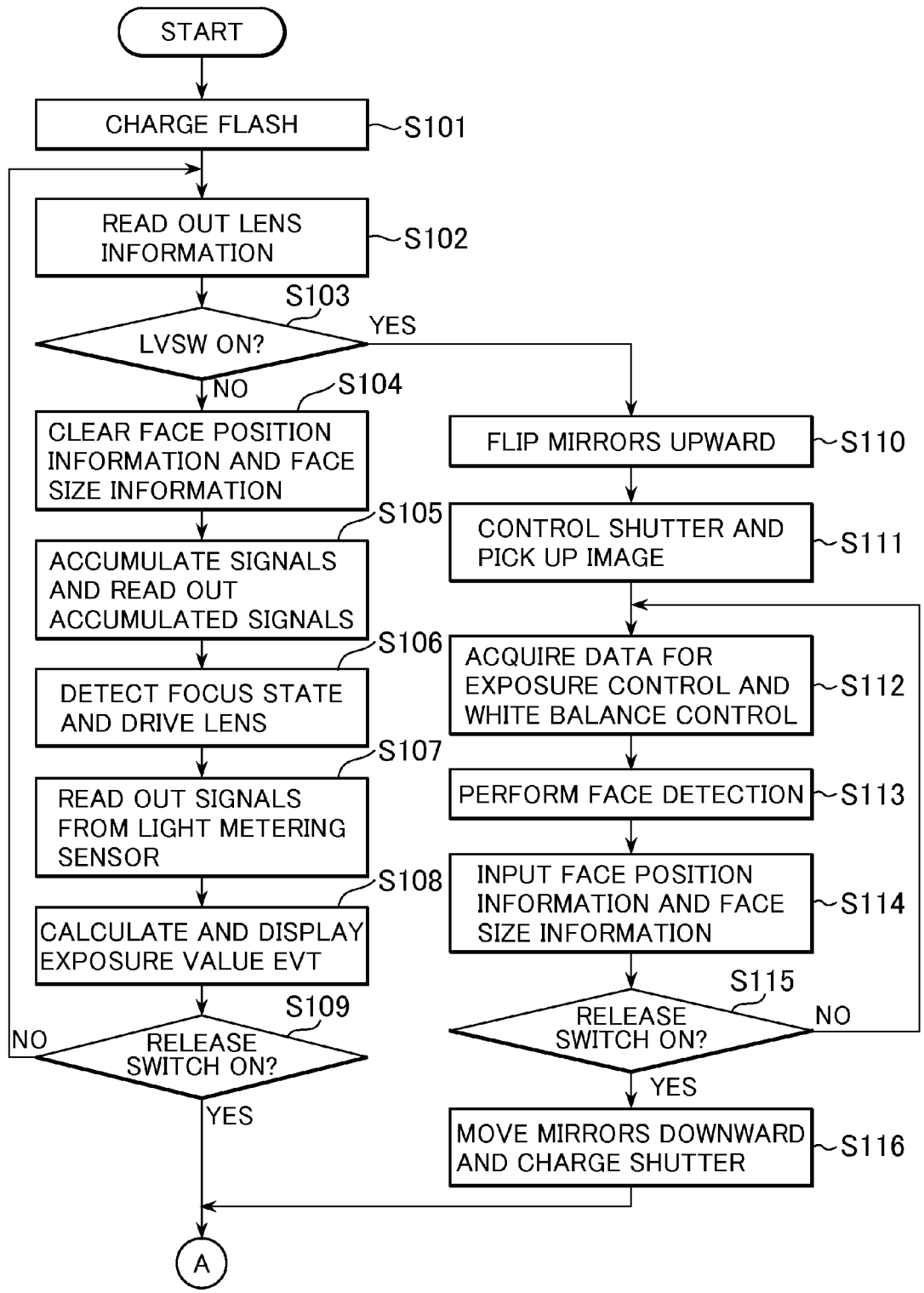
FIG. 6A is part of a flowchart showing a concrete operation sequence of the camera.
Figure 6B:
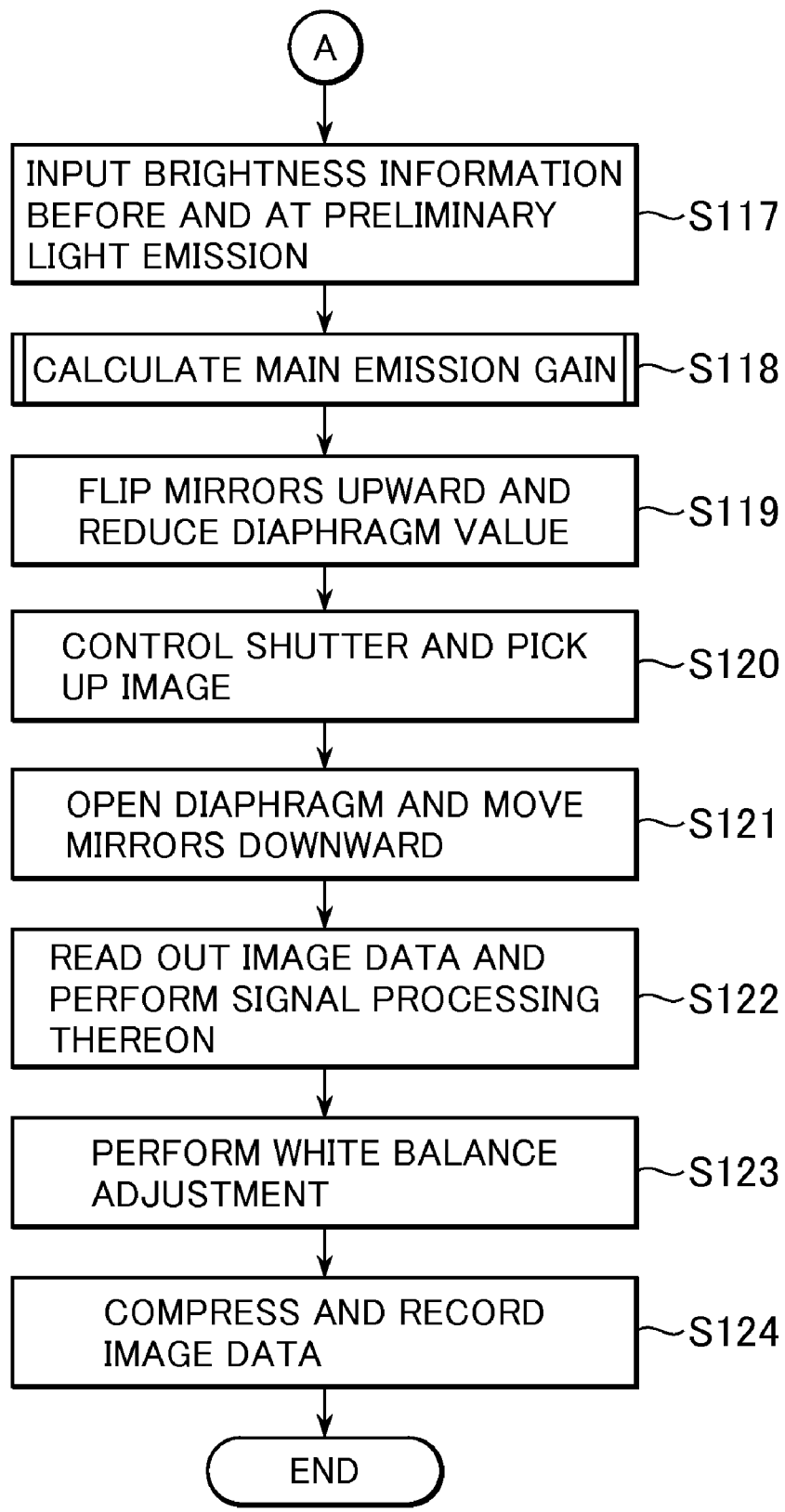
FIG. 6B is the remaining part of the flowchart following FIG. 6A.

FIGS. 6A and 6B show in flowchart a specific operation sequence in the camera relating to this invention.

When a power switch (not shown) of the camera is turned on by an operator, the control unit 41 of the camera body 1 is made operable, and a process shown in FIGS. 6A and 6B is started.

In step S101, the control unit 41 communicates with the flash control unit 61 of the flash unit 3 and instructs the flash control unit to operate the step-up circuit 62 to perform charging so as to generate a high voltage sufficient for emission by the emission device 34 (flash).

Next, in step S102, the control unit 41 communicates with the lens control unit 51 of the lens unit 2, and acquires information on various lenses constituting the lens unit 2, which are required for distance measurement and light metering.

Next, in step S103, the control unit 41 checks whether or not the live-view start switch (LVSW) 49 is made ON by the operator. If the live-view start switch 49 is not made ON, the process proceeds to step S104.

In the step S104, the control unit 41 clears face position information indicating a coordinate of a position of a human subject's face in the imaging screen and face size information indicating the size of the human subject's face, which were stored in the RAM 41e at the preceding photographing. This is because the face position information and the face size information which are useful when the live-view start switch 49 is made ON and a live view operation is started, but otherwise are meaningless.

Next, in step S105, the control unit 41 outputs a control signal to the focus-detecting sensor 20 to cause the signal accumulation section to accumulate signals generated at focus detection by the focus-detecting sensor 20. Upon completion of signal accumulation, the control unit 41 reads out signals accumulated in the signal accumulation section of the focus-detecting sensor 20 and performs A/D conversion thereon. Furthermore, the control unit 41 performs various required data corrections such as shading correction on digital data obtained by the A/D conversion.

Next, in step S106, the control unit 41 inputs lens information required for focus detection, etc. from the lens control unit 51, and calculates focus states at various portions of the imaging screen based on the lens information and the digital data obtained from the focus-detecting sensor 20. Moreover, the control unit 41 determines a region in the imaging screen to which focusing is to be made, among the focus detection positions S0 to S2 (FIG. 4). If there is a region designated in advance by the operator's manipulation, the control unit 41 may select the region designated by the operator. Then, the control unit 41 calculates a lens movement amount to realize an in-focus state in accordance with the focus state in the determined region, and outputs the calculated lens movement amount to the lens control unit 51.

In accordance with the lens movement amount, the lens control unit 51 outputs a driving signal to the second motor driver 52 for driving a focus control lens, whereby the second motor 53 is driven. As a result, the taking lens is brought in an in-focus state relative to the subject. When the focus control lens is driven, information measured by the distance encoder 56 varies, and information on absolute distance to subject after the focus adjustment can be attained. Then, the control unit 41 communicates with the lens control unit 51, and renews information on various lenses.

Next, in step S107, the control unit 41 reads out signals from the 35 parts of the light metering sensor 26, i.e., the light receiving portions PD1 to PD35 (FIG. 3), and performs A/D conversion thereon, thereby inputting brightness information on various portions of the imaging screen. Furthermore, the control unit 41 inputs required lens information, etc. from the lens control unit 51, and corrects the brightness information on various portions of the imaging screen, thereby obtaining subject brightness information on respective ones of the light receiving portions PD1 to PD35 of the light metering sensor 26.

Next, in step S108, the control unit 41 calculates brightness of the entire imaging screen from the obtained subject brightness information on the respective light receiving portions PD1 to PD35 of the light metering sensor 26, while assigning weights to brightness information on light receiving portions of the light metering sensor 26 corresponding to the focus detection positions S0 to S2 subjected to focus detection by the focus-detecting sensor 20. Based on the thus calculated brightness information on the entire imaging screen, the control unit 41 determines an electric charge accumulation time (i.e., shutter speed) and a diaphragm value (f-stop number) in the image pickup device 12 suitable for photographing in accordance with a prescribed program diagram (not shown), and displays the same on the display unit 47. In a case that either the shutter speed or the diaphragm value is preset in advance, the other factor is determined so as to provide a satisfactory exposure in combination with the preset value.

An exposure value based on apex values of the determined shutter speed and the diaphragm value is called EVT. The exposure value EVT is represented by the following formula.

EVT=Tv+Av, where Tv represents an apex value of the shutter speed and Av represents an apex value of the diaphragm value.

Next, in step S109, the control unit 41 waits for the release switch 48 being turned ON by the operator. If the release switch 48 is not turned ON, the process returns to step S102. When the release switch 48 is turned ON, the process proceeds to step S117.

If it is determined at step S103 that the live-view start switch 49 is ON, the process proceeds to step S110. In the step S110, the control unit 41 outputs a control signal to the first motor driver 45 to drive the first motor 46, whereby the main mirror 13 and the first reflecting mirror 14 are flipped upward.

Next, in step S111, the control unit 41 outputs a control signal to the shutter driving unit 42 to make the shutter 10 in an open state. As a result, light beams from the taking lens enter the image pickup device 12, making it possible for the image pickup device 12 to pick up an image. Then, the control unit 41 instructs the signal processing circuit 43 to cause the image pickup device 12 to perform an image pick up operation. When the image pickup operation is started, the control unit 41 controls the display unit 47 to display a picked-up image thereon. Thus, a live view operation is started.

Next, in step S112, the control unit 41 acquires data for exposure (AE) control and white balance (WB) control from picked-up image data to display a live view image on the display unit 47 in appropriate brightness and color, and performs corrections to charge storage time and color processing in the image pickup device 12 based on the acquired data. An exposure value EVT at main photographing is also calculated from data for exposure control. Exposure control data such as shutter speed and diaphragm value is also calculated, where required, as with the calculation in the step S108.

Next, in step S113, the control unit 41 causes the signal processing circuit 43 to perform face detection processing on the picked-up image. In the face detection processing, as described in Japanese Laid-open Patent Publication No. 2005-184508, characteristic edges of eyes and a mouth are extracted from image data to detect a human face position, and a contour including the eyes and the mouth is detected. Then, the center of gravity of the contour and the brightness of a region within the contour are calculated. Furthermore, face position information in the imaging screen is determined based on the calculated center of gravity, and face size information is determined from contour information.

Next, in step S114, the control unit 41 acquires the face position information and the face size information determined by the signal processing circuit 43, and stores them in the RAM 41e. The face position information may be x- and y-coordinates relative to the origin set at a predetermined point such as the center or the left upper end of the imaging screen. The face size information may be data representing a range over which the face region extends, such as data representing the radius of a circle centered at the face position or representing the length of any side of a square.

Next, in step S115, the control unit 41 waits for the release switch 48 being made ON by the operator. If the release switch 48 is not made ON, the process returns to the step S112 and processing in the steps S112 to S114 is repeated. If the release switch 48 is made ON, the process proceeds to step S116.

In the step S116, the control unit 41 outputs a control signal to the shutter driving unit 42 to cause the shutter 10 to be closed, whereby the live view operation is completed. Then, the control unit 41 outputs a control signal to the first motor driver 45 to drive the first motor 46, whereby the main mirror 13 and the first reflecting mirror 14 are moved downward from the upwardly flip-state and the shutter 10 is charged.

Next, in step S117, the control unit 41 reads out signals from the 35 division parts of the light metering sensor 26, i.e., the light receiving portions PD1 to PD35, and performs A/D conversion thereon to thereby input brightness information on various portions of the imaging screen immediately before execution of preliminary light emission. The brightness information (brightness value) on each light receiving portion of the light metering sensor 26 immediately before preliminary light emission is called P(i), where "i" varies from 1 to 35 corresponding to the light receiving portions PD1 to PD35. Then, the control unit 41 communicates with the flash control unit 61 and instructs the emission device 34 (flash) to perform preliminary light emission.

The flash control unit 61 causes the emission device 34 to emit light with a predetermined amount of preliminary light emission in accordance with an output signal of the emission amount detection sensor 37. To obtain subject brightness information during execution of the preliminary light emission, the control unit 41 reads out signals from the light receiving portions PD1 to PD35 of the light metering sensor 26 and performs A/D conversion thereon to thereby input brightness information on various portions of the imaging screen during the execution of preliminary light emission. The brightness information (brightness value) on each light receiving portion of the light metering sensor 26 at preliminary light emission is called H(i), where "i" varies from 1 to 35 corresponding to the light receiving portions PD1 to PD35.

Next, in step S118, the control unit 41 performs calculation to determine an amount of main flash (main emission gain) of the emission device 34 (flash). A description of concrete calculation processing will be described later with reference to a flowchart in FIG. 7.

Next, in step S119, the control unit 41 outputs a control signal to the first motor driver 45 to drive the first motor 46, whereby the main mirror 13 and the first reflecting mirror 14 are flipped upward. Then, the control unit 41 outputs the diaphragm value information calculated in the step S107 to the lens control unit 51 of the lens unit 2.

The lens control unit 51 outputs a control signal to the third motor driver 54 to drive the diaphragm 31 in accordance with the diaphragm value information, thereby driving the third motor 55. As a result, the taking lens is made in a reduced state.

Next, in step S120, the control unit 41 outputs a control signal to the shutter driving unit 42 to make the shutter 10 in an open state. As a result, light beams from the taking lens enter the image pickup device 12, making it possible for the device 12 to pick up an image. Then, the control unit 41 instructs the signal processing circuit 43 to set the charge accumulation time in the image pickup device 12 in accordance with the shutter time calculated in the step S107 and cause the image pickup device 12 to pick up an image. The control unit 41 instructs the flash control unit 61 of the flash unit 3 to cause the emission device 34 to emit light in synchronism with photographing timing.

In accordance with the emission instruction, the flash control unit 61 causes, based on the output signal of the emission amount detection sensor 37, the emission device 34 to emit light with an emission amount corresponding to the amount of main flash calculated in the step S118. As a result, image pickup is performed with flash emission. Upon completion of the image pickup, the control unit 41 outputs a control signal to the shutter driving unit 42 to make the shutter 10 in a light interception state. As a result, light beams from the taking lens to the image pickup device 12 are intercepted.

Next, in step S121, the control unit 41 outputs information to the lens control unit 51 of the lens unit 2 to open the diaphragm 31. In accordance with the information, the lens control unit 51 outputs a control signal to the third motor driver 54 to drive the diaphragm 31, whereby the third motor 55 is driven and the taking lens is made in a diaphragm open state. Furthermore, the control unit 41 outputs a control signal to the first motor driver 45 to drive the first motor 46, thereby moving the main mirror 13 and the first reflecting mirror 14 downward.

Next, in step S122, the control unit 41 instructs the signal processing circuit 43 to read out picked-up image information from the image pickup device 12 while performing A/D conversion thereon and to perform required correction and interpolation processing thereon.

Next, in step S123, the control unit 41 instructs the signal processing circuit 43 to perform white balance adjustment on the picked-up image information. Specifically, white-colored regions of the subject are extracted based on color-difference signals, which are contained in the picked-up image information and correspond to respective division regions of one screen. Furthermore, based on signals for the extracted white-colored regions, gain corrections are made on red and blue channels over the entire imaging screen, whereby the white balance adjustment is performed.

Next, in step S124, the control unit 41 instructs the signal processing circuit 43 to perform compression and conversion of the picked-up image information after the white balance adjustment into a record file format and store it into the storage unit 44. When the steps S101 to S124 are executed, a series of photographing sequences is completed.

In the following, the calculation process in step S118 of FIG. 6B to determine the amount of main flash of the emission device 34 is described with reference to FIG. 7.

Figure 7:
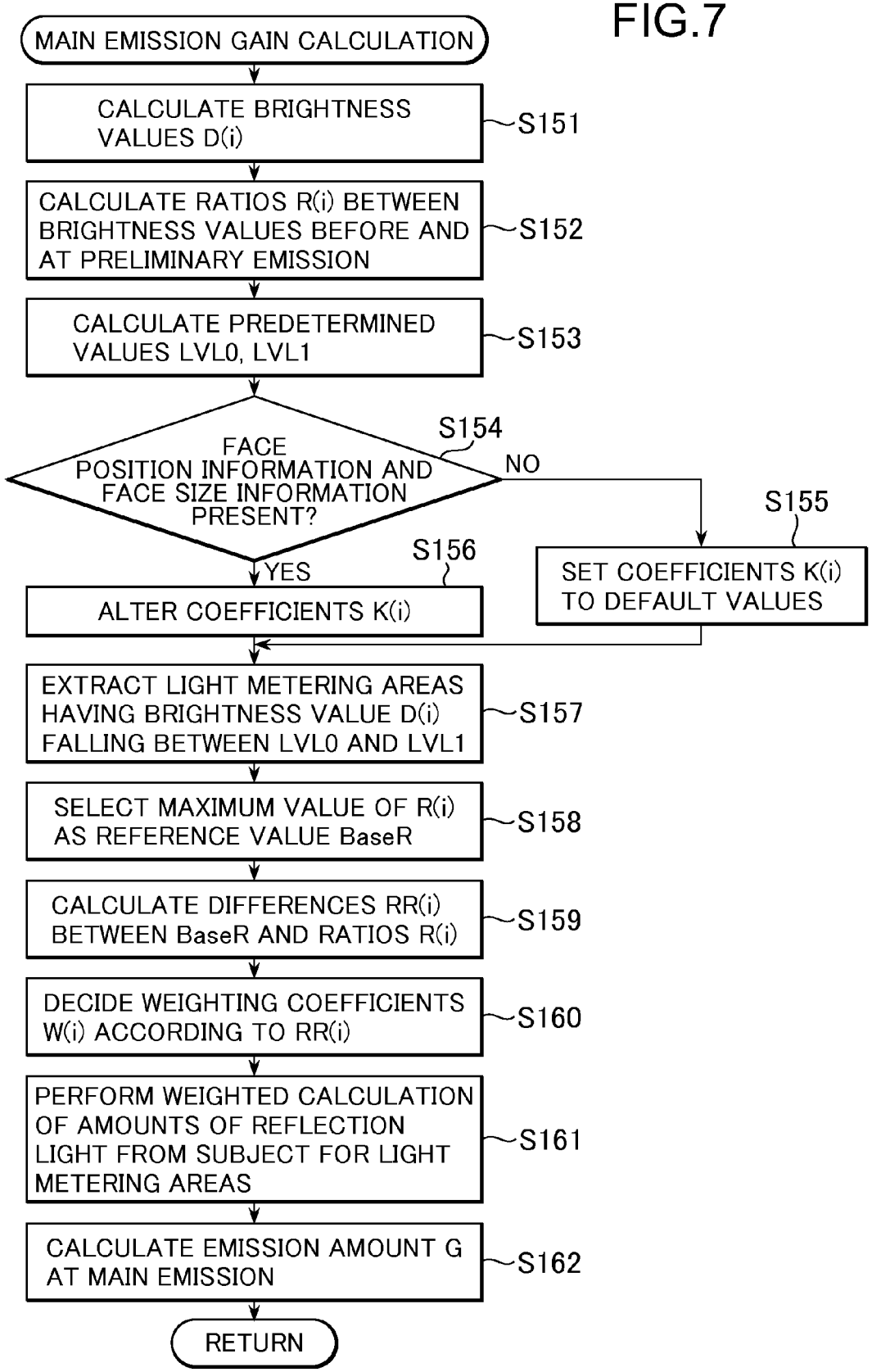
FIG. 7 is a flowchart showing the details of a calculation process to decide an amount of main flash (main emission gain) of an emission device.

FIG. 7 shows in flowchart the details of the calculation process to determine the amount of main flash of the emission device.

In step S151 of FIG. 7, based on brightness values P(i) immediately before preliminary light emission and brightness values H(i) at the preliminary light emission, the control unit 41 calculates brightness values D(i) corresponding only to reflection light at the preliminary light emission (subject reflection light amounts) for respective light metering areas (light metering regions) of the light metering sensor 26. In the calculation of the brightness values D(i), the brightness values P(i), H(i) which are values in a compression system are raised to powers and expanded, and respective differences are subjected to logarithmic compression, as shown in the following formula.

$D(i) = \log_2(2^{H(i)} - 2^{P(i)})$, where "i" varies from 1 to 35 corresponding to the light receiving portions (light metering areas) PD1 to PD35, i.e., the 35 division parts of the light metering sensor 26.

Next, in step S152, the control unit 41 calculates, based on the brightness values P(i), H(i) immediately before and at the preliminary light emission, ratios R(i) between the brightness values for the respective light metering areas of the sensor 26, as shown in the following formula.

$R(i) = H(i) - P(i)$

Since the brightness values P(i), H(i) immediately before and at the preliminary light emission are values in a compression system, determining respective differences between the brightness values is equivalent to determining ratios therebetween.

The reason why the ratios of brightness values are determined is that, among the 35 light metering areas of the light metering sensor 26, light metering areas having the same ratio of brightness values can be regarded as having the same distance to subject, as described in Japanese Laid-open Patent Publication No. 2005-275265.

Next, in step S153, the control unit 41 calculates predetermined values LVL0, LVL1 from information on the distance to subject, as represented by formulae given below. The control unit 41 calculates the value LVL0 based on information on the distance encoder 56 (distance information D on object distance to subject) obtained from the lens control unit 51 in step S102 or S106 and information C2 on emission amount at preliminary light emission in consideration of reflection brightness of a subject having a standard reflectance at a distance represented by the distance information D.

Specifically, the value LVL0 is determined such that it becomes slightly higher than reflection brightness of a subject having a standard reflectance at a distance represented by the distance information D on object distance to subject (hereinafter abbreviated as distance information D). This is because since the distance information D includes some error in actuality, the value LVL0 is made higher by about the error, whereby the reflection brightness of an actual subject having a standard reflectance at preliminary light emission is prevented from becoming higher than LVL0.

$LVL0 = -\log_2(D) \times 2 + C2$

On the other hand, the value LVL1 is determined by subtracting a value C3 from LVL0. The value C3 is determined by taking account of an error of the distance information D, etc., whereby the reflection brightness of the actual subject having a standard reflectance at preliminary light emission is prevented from becoming lower than LVL1.

$LVL1 = LVL0 - C3$

The below-described calculation to determine an amount of main flash emission from the distance information D is carried out on an assumption that reflection brightness of the subject at preliminary light emission usually varies between the predetermined values LVL0 and LVL1 as described above.

In a single-lens reflex type camera with interchangeable lenses, depending on the lens mounted to the camera body, there is no distance encoder 56 and the distance information D cannot be obtained. In the following, a description is given of how the predetermined values LVL0 and LVL1 are calculated in such a case.

First, the predetermined value LVL0 is decided based on focal distance information on the taking lens by referring to an LVL0 determination table (table 1) shown in FIG. 8.

$LVL0 = table1(f)$

In the LVL0 determination table, there is shown a correspondence relation between the predetermined value LVL0 and the focal distance (f) of the taking lens.

Referring to the LVL0 determination table, for the taking lens whose focal distance (f) is 28 mm (f<40 mm), the predetermined value LVL0 is set to a value indicating reflection brightness of a subject having a standard reflectance and located at a distance of 0.5 m (standard reflection light amount at 0.5 m). In most cases, an amount of reflection light at preliminary light emission is lower than LVL0 since the frequency of photographing a subject at close range less than 0.5 m by using the taking lens whose focal distance is 28 mm is generally extremely small.

For the taking lens whose focal distance is 50 mm, LVL0 is set to a value indicating the reflection brightness of a subject having a standard reflectance at a distance of 0.8 m. In this way, the LVL0 determination table shown in FIG. 8 is configured. Since it is reasonable that the entire range of focal distance of the taking lens is stepwise divided, there are a plurality of focal distance ranges in the LVL0 determination table.

In a case that distance information D is not obtainable, the predetermined value LVL1 is calculated by subtracting a value C1 from the predetermined value LVL0. The value C1 is decided such that an amount of reflection light from a subject having a standard reflectance at preliminary light emission is empirically never lower than LVL1. For example, if the possibility of performing flash-photographing at a distance of 6.4 m or more away from the subject by using a taking lens whose focal distance is 50 mm is extremely low, the amount of reflection light from the subject is, e.g., 6-stage lower than that at a distance of 0.8 m at which the predetermined value LVL0 is decided. In that case, the value C1 is set to 6.

LVL1=LVL0−C1, where both LVL0 and LVL1 are values in a compression system.

Next, in step S154, the control unit 41 checks whether or not face position information and face size information have been obtained from the signal processing circuit 43. If the live-view start switch 49 is made ON (YES to step S103) to start a live view operation, the face position information and the face size information are already obtained at step S114. Otherwise, the face position information and the face size information at the preceding photographing have been cleared at step S104. In that case, it is determined at step S154 that face position information and face size information are not obtained, and the process proceeds to step S155.

In the step S155, the control unit 41 sets coefficients K(i), which are used to restrict option areas from which a reference value BaseR, described later, is to be selected, to prescribed default values. As shown in FIG. 9A, the coefficients K(i) are set for respective ones of the 35 divided light metering areas of the light metering sensor 26. As shown in FIG. 9B, the prescribed default values are set to "0" for K(1) to K(8), K(14), K(15), K(21), K(22), K(28), K(29), and K(35), and set to "1" for others.

If it is determined at step S154 that the face position information and the face size information are already obtained, the process proceeds to step S156. In the step S156, the control unit 41 alters the coefficients K(i) from the prescribed default values or sets the coefficients K(i) to the default values in accordance with the face position information.

If, for example, the face position information indicates that a human face is present at or near the center of the imaging screen as shown in FIG. 9C, the coefficients K(i) are kept remained at the prescribed default values. If the face position information indicates that a human face is present at a location close to a left end of the imaging screen as shown in FIG. 9D, coefficients K(i) at four locations, i.e., K(8), K(15), K(22), and K(29), are altered from the prescribed default value of 0 to a value of 1.

Although not shown, if the face position information indicates that a human face is present at a location close to a right end of the imaging screen, coefficients K(i) at four locations, i.e., K(14), K(21), K(28), and K(35), are altered from the prescribed default value of 0 to a value of 1. If the face position information indicates that a human face is present is present at a location close to an upper part of the imaging screen, coefficients K(i) at five locations, i.e., K(2) to K(6), are altered from the prescribed default value of 0 to a value of 1.

As described above, in accordance with the face position information and the face size information (face information) obtained by the signal processing circuit 43, the control unit 41 sets the coefficients for restricting those light metering regions from which the reference value BaseR (reference ratio value) should be extracted.

If the face size information is considerably large in value and a human face covers substantially the entire imaging screen as shown in FIG. 9F, the values of coefficients K(i) at end portions of the imaging screen, even if they are altered according to the face position information, do not provide a substantial meaning to a result of calculation of the amount of main flash. This is because the face region covers a large number of those light metering regions (sensor parts) of the light metering sensor 26 which are at or near the center of the imaging screen. Thus, if the face size information is equal to or larger than a predetermined value, the coefficients K(i) may be kept remained at the prescribed default values shown in FIG. 9A.

Next, in step S157, the control unit 41 extracts regions in each of which the brightness value D(i) falls between the predetermined values LVL0 and LVL1, among those areas out of the 35 divided light metering areas of the light metering sensor 26 for which the coefficient K(i) is equal to 1, thereby excluding light metering areas in which the brightness value D(i) is abnormally large due to regular reflection from a mirror finished material such as glass or abnormally small due to the subject located at a remote distance to which flash light of the emission device 34 does not reach. As a result, light metering areas are extracted in which a main subject is likely present.

It should be noted that in the step S157, brightness values H(i) at preliminary light emission may be used instead of brightness values D(i) since most of the brightness values H(i) are not largely different from the brightness values D(i) (most of brightness values P(i) immediately before preliminary light emission are small).

As described above, the regions from which the reference value BaseR should be extracted are extracted from those light metering areas for which the coefficients K(i) each have a value of 1. Therefore, in a condition that the coefficients K(i) are kept remained at the prescribed default values, light metering areas at upper, left and right ends of the imaging screen where the main subject is unlikely positioned are normally excluded from candidate light metering areas for being extracted. On the other hand, a light metering area for which the coefficient K(i) is altered from 0 to 1 according to the face position information is altered to a candidate region being extracted since there is a possibility that the main subject, i.e., human face, is present in that region.

Since there is a high possibility that the main subject is present in the closest area among the extracted light metering areas, the control unit 41 selects in step S158, as a reference area, a light metering area in which there appears a maximum value of ratios R(i) between the brightness values P(i), H(i) immediately before and at preliminary light emission (before and during preliminary emission operation) (first and second brightness values). The value of ratio R(i) in the reference area is called a reference value BaseR (reference ratio value), and the light metering area having the ratio R(i) equal to the reference value BaseR is called a main subject area.

Next, in step S159, the control unit 41 calculates a difference RR(i) between the reference value BaseR and the ratio R(i) for each of all the light metering areas of the light metering sensor 26 (i=1 to 35), as represented by the following formula.

$$RR(i)=BaseR-R(i)$$

Since both the ratio R(i) and the reference value BaseR are values in a compression system, calculating the difference RR(i) between the ratio R(i) and the reference value BaseR is equivalent to calculating a ratio between the ratio R(i) for the reference area (the reference value BaseR) and the ratio R(i) for each of other light metering areas. A subject in a light metering area where the value of RR(i) is small can be regarded as being located at substantially the same distance as a subject in the light metering area supposed as the main subject area.

On the other hand, a subject in a light metering area where the value of RR(i) is large in positive direction can be regarded as being located far away than a subject in the light metering area supposed as the main subject area. Conversely, a subject in a light metering area where the value of RR(i) is large in negative direction can be regarded as being located closer than a subject in the light metering area supposed as the main subject area.

It is considered that in the above light metering areas, there is an obstacle short of the main subject or there is produced a reflection light amount which is abnormally high due to regular reflection from a mirror finished material such as glass.

Next, in step S160, the control unit 41 decides weighting coefficients W(i) according to the differences RR(i) calculated for all the light metering areas (i=1 to 35) of the light metering sensor 26. Specifically, the weighting coefficients W(i) are determined based on the values of RR(i) for the light metering areas and referring to a W(i) value determination table (table 2) in FIG. 10, as represented by the following equation.

$$W(i)=table2(RR(i))$$

In the W(i) value determination table, there is shown a correspondence relation between RR(i) and W(i).

According to the W(i) value determination table, the weighting coefficient W(i) of a maximum value of 12 is given to a light metering area in which the value of the difference RR(i) is equal to or extremely close to the reference value BaseR. This is because such region can be regarded as the main subject region or a subject region in which there is a subject located at the same distance as the main subject. A higher value of W(i) is given to a light metering area having an RR(i) value closer to the reference value BaseR. With the increase in absolute value of RR(i) of a light metering area from a value of 0, a weighting coefficient W(i) given to the light metering area gradually decreases. This is because there is a high possibility that a light metering area having a large absolute value of RR(i) is a subject region different from the main subject region.

As described above, each light metering area is assigned with the weighting coefficient W(i) that varies according to the distance to subject, and then an amount of main flash is calculated in the subsequent steps. This makes it possible to calculate substantially the same amount of main flash when the position of the main subject in the imaging screen moves between successive picked-up images or when the same scene is photographed with the composition slightly changed, whereby the exposure can be prevented from being different between adjacent picked-up images.

It should be noted that the weighting coefficient W(i) of a large value is assigned to even a light metering area for which the coefficient K(i) is set to 0 in step S155 or S156 and which is excluded from option areas from which the reference value BaseR is to be determined, if RR(i) for such light metering area has a value close to the reference value BaseR. In this point, this embodiment differs from the technique disclosed in Japanese Laid-open Patent Publication No. 2005-184508 in which a face region is detected and the detected face region is set as a light control region for calculation of an amount of main flash.

Next, in step S161, the control unit 41 performs a weighted calculation of amounts of reflection light from the subject for all the light metering areas of the light metering sensor 26, as represented by the following formula.

$$AVE=S(D(i) \times W(i))/SW(i)$$

By the weighted calculation, an average value AVE of amounts of reflection light over the entire image screen is calculated, with a larger weight assigned to a light metering areas whose distance to the subject is closer to that of the light metering area regarded as the main subject area.

Next, in step S162, the control unit 41 calculates an emission amount G at main emission in accordance with the exposure value EVT determined in step S108 or S112 based on the apex values of shutter speed and diaphragm value and the average value AVE calculated in step S161.

$$G=EVT-AVE$$

Specifically, the control unit 41 compares the value of the ratio R(i) of brightness values immediately before and at preliminary light emission for each light metering region of the light metering sensor 26 with the reference value BaseR (reference ratio value), and calculates the emission amount G of the emission device 34 at exposure operation based on results of the comparisons.

The emission amount G at main emission is a value relative to the flash emission amount at preliminary light emission. The value of emission amount G is delivered by communication from the control unit 41 of the camera body 1 to the flash control unit 61 of the flash unit 3. As a result, main emission is carried out in step S120 with the emission amount G, whereby a desired flash image pickup operation is performed.

Second Embodiment

A second embodiment of this invention is different from the first embodiment (FIGS. 1 to 5) in the following points but the same in other points. Therefore, a repetitive description is omitted.

In the first embodiment, the coefficients K(i) for restricting option areas from which the reference value BaseR is to be selected are set to the default values as shown in FIG. 9B, if the face position information and the face size information are not obtained, and the default values are partly altered, if the face position information and the face size information are already obtained. In this embodiment, the settings of coefficients K(i) are made as described below.

FIGS. 11A to 11E show examples of a setting combination table for coefficients K(i), which are used for restricting option areas from which the reference value BaseR is to be selected.

In the table shown in FIG. 11A, the coefficients K(i) are each equal to a value of 0 for K(1) to K(8), K(14), K(15), K(21), K(22), K(28), K(29), and K(35), and equal to a value of 1 for others. In the table in FIG. 11B, the coefficients K(i) are equal to a value of 0 for K(1) to K(7), K(13), K(14), K(20), K(21), K(27), K(28), K(34), and K(35), and equal to a value of 1 for others.

In the table in FIG. 11C, the coefficients K(i) are equal to a value of 0 for K(1) to K(9), K(15), K(16), K(22), K(23), K(29), and K(30), and equal to a value of 1 for others. In the table in FIG. 11D, the coefficients K(i) are equal to a value of 0 for K(1), K(7), K(8), K(14), K(15), K(21), K(22), and K(28) to K(35), and equal to a value of 1 for others. In the table in FIG. 11E, the coefficients K(i) are equal to a value of 0 for K(1), K(7), K(29), and K(35), and equal to a value of 1 for others.

In the five setting combination tables for coefficients K(i) (coefficient value tables), the coefficients K(i) for restricting the option areas are set in advance for respective ones of the light metering areas (light metering regions). The control unit 41 selects suitable coefficients from any of the five setting combination tables for coefficients K(i) in accordance with the face information (face position information and face size information).

When it is determined at step S154 in FIG. 7 that the face position information and the face size information are not obtained, the process proceeds to step S155, as described above. Then, the standard K(i) value table of FIG. 11A is selected in step S155. If the position information is obtained, the process proceeds to step S156 in which any of the tables of FIGS. 11A to 11E is selected according to the face information. Specifically, if the face position information which is being input indicates a left end part of the imaging screen, the table of FIG. 11B is selected. If the face position information being input indicates a right end part of the imaging screen, the table of FIG. 11C is selected.

If the face position information being input indicates an upper end part of the imaging screen, the table of FIG. 11D is selected. If the face position information being input indicates a central part or a lower end portion of the imaging screen, the table of FIG. 11A is selected. If the face size information being input is equal to or larger than a predetermined size, the table in FIG. 11E is selected irrespective of the face position information. Other constructions and flowchart may be the same as those of the first embodiment.

In the above example, the setting combination tables for coefficients K(i) is five in number, but this is not limitative. Also, it may be arranged that option areas are switched in a matrix fashion in accordance with a combination of the face position information and the face size information.

With the first and second embodiments, various effects can be attained by the following control. Specifically, prior to the exposure operation, the control unit 41 of the camera body 1 instructs the emission device 34 of the flash unit 3 to perform a preliminary light emission operation. Subject brightnesses in the light metering areas are photometrically measured by the light metering sensor 26 at a first timing immediately before preliminary light emission and at a second timing during the preliminary light emission. Prior to the exposure operation, the control unit 41 inputs the human face information (face position information and face size information) from the signal processing circuit 43.

The control unit 41 calculates, for each light metering area, a ratio R(i) between first light metering information P(i) photometrically measured at the first timing (brightness value immediately before preliminary light emission) and second light metering information H(i) photometrically measured at the second timing (brightness value during preliminary light emission operation).

Next, the control unit 41 sets, in accordance with the human face information, the coefficients K(i) for restricting light metering areas from which the reference value BaseR is to be extracted, and extracts the reference value BaseR (reference ratio value) from the ratios R(i) for the thus set light metering areas. The control unit 41 compares the reference value BaseR with a value of R(i) in each light metering area, and calculates an amount of emission of the emission device 34 of the flash unit 3 at exposure operation based on results of the comparisons.

As described above, the light metering areas from which the reference value BaseR is to be extracted are properly restricted (i.e., narrowed) by using the coefficients K(i) which are different between when the main subject (human face) is at near the center of the imaging screen and when it is at near the periphery thereof, thus making it possible to increase the possibility of attaining the exposure intended by the photographer.

According to the example constructions of the first and second embodiments, in the settings of the coefficients K(i) for restricting option areas (light metering areas) from which the reference value Base R is to be selected in a photographing state where face position information is not obtained, the coefficients K(i) for those peripheral regions of the imaging screen in which the possibility of presence of the main subject is usually extremely small are set to a value of 0, as shown in FIG. 9B or 11A.

It is therefore possible to reduce the possibility that a flash-emission level is made inappropriate by those peripheral regions of the imaging screen where a physical body unintentionally included is present being selected as the option areas. As a result, it is possible to further increase the accuracy of extracting the main subject region intended by the photographer, i.e., the possibility of attaining the exposure intended by the photographer.

On the other hand, in a photographing state where face position information is already obtained, the coefficients K(i) are altered in accordance with the face position information, as shown in FIG. 9E or FIGS. 11B to 11D. Specifically, a value of 1 is set to the coefficients K(i) for regions, even at the periphery of the imaging screen, that include a human's face, which is highly possible to be the main subject, whereby these regions are selected as option areas from which the reference value BaseR is to be extracted. The coefficients K(i) for peripheral regions in which a human's face is not present are kept remained at a value of 0.

Thus, it becomes possible to reduce the possibility that a flash-emission level is made inappropriate by those peripheral regions of the imaging screen being selected as the option areas, into which a physical body is unintentionally included, thereby making it possible to further increase the accuracy of extracting the main subject region intended by the photographer, i.e., the possibility of attaining the exposure intended by the photographer.

As in the technique disclosed in Japanese Laid-open Patent Publication No. 2005-275265, it is also possible to perform photographing with flash emission in which an amount of main flash is determined by assigning a high weight to a main subject region and to a region located at substantially the same distance as the main subject region. This makes it possible to attain an effect of suppressing a variation in exposure between picked-up images due to a variation in an amount of flash-emission caused by a movement of the subject in similar photographing scenes or by a change in composition.

Third Embodiment

A third embodiment of this invention is different from the first embodiment in the calculation process in step S118 in FIG. 6B, but is the same in other respects.

Figure 12A:
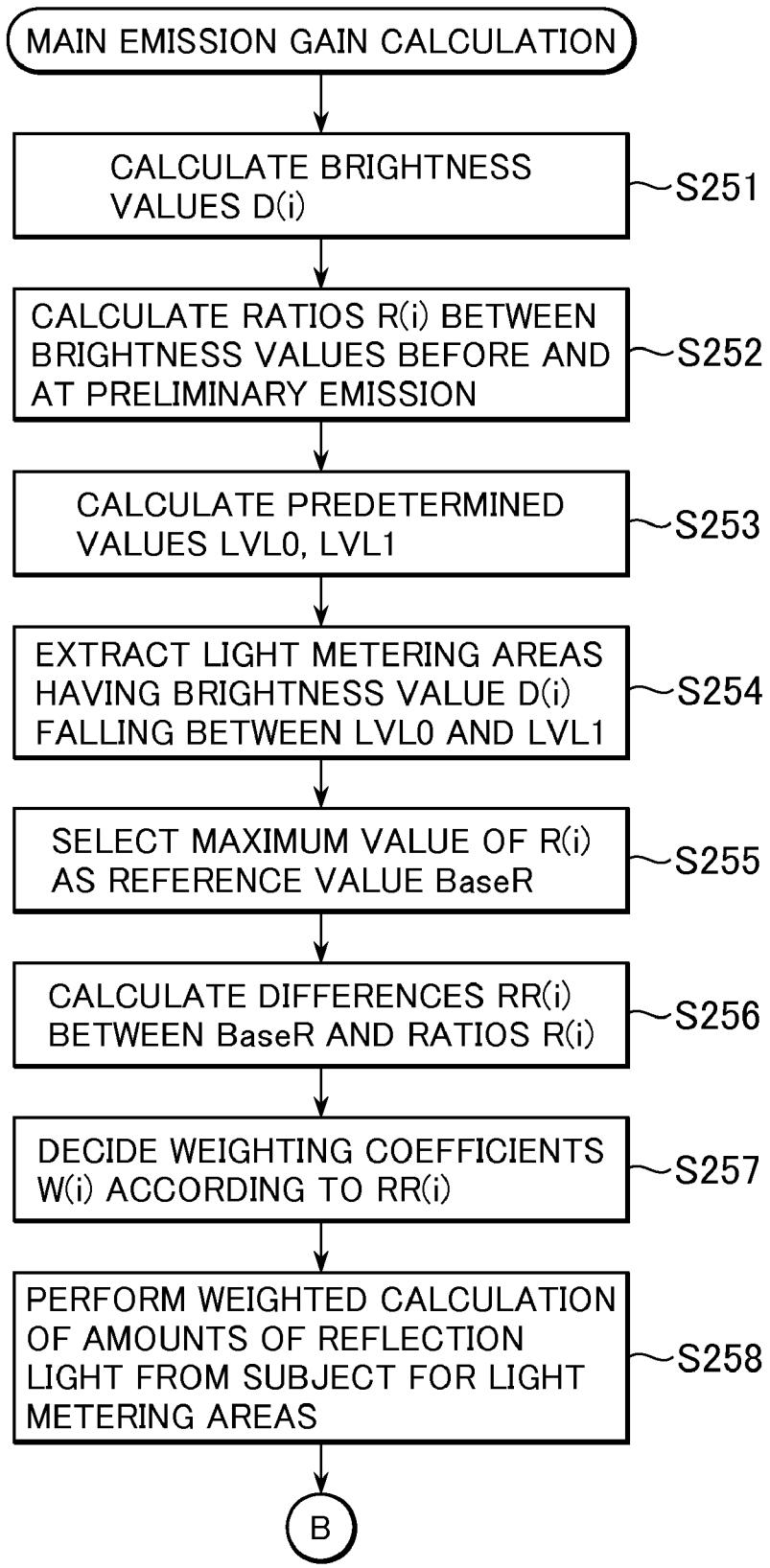
FIG. 12A is a part of a flowchart showing the details of a calculation process for determining an amount of main flash of an emission device according to a third embodiment of this invention.

FIGS. 12A and 12B show in flowchart the details of the calculation process to decide an amount of main flash (main emission gain) of the emission device.

The processing in steps S251 to 258 in FIG. 12A is the same as that in the steps S151 to S153 and S157 to S161 in FIG. 7, and hence a description thereof is omitted.

In step S259, the control unit 41 checks whether or not distance encoder information is obtained from the lens control unit 51. In this embodiment, the lens unit 2 is equipped with the distance encoder 56. If distance information D (corresponding to an amount of thrust of focus adjustment lens) measured by the distance encoder 56 as information on the absolute distance to subject is obtained, the process proceeds to step S260.

In the step S260, the control unit 41 calculates a predetermined value LVL2 (reference reflection light amount) based on the distance information D in accordance with the following formula. As with the calculation in step S253, the value LVL2 is calculated based on the distance information D measured by the distance encoder 56 and obtained from the lens control unit 51 and information C4 on an amount of emission at preliminary light emission in consideration of reflection brightness of a subject having a standard reflectance at a distance represented by the distance information D.

The value LVL2 is determined so as to nearly coincide with the reflection brightness of a subject having a standard reflectance at the distance represented by the distance information D, so that accurate calculation of the amount of main flash is made possible when the distance represented by distance information D coincides with the actual distance to subject.

$$LVL2 = -\log_2(D) \times 2 + C4$$

Next, in step S261, the control unit 41 checks whether or not face position information and face size information are obtained. In a case that a live view operation has been started, the face position information and the face size information are already obtained at step S114. Otherwise, the face position information and the face size information at the preceding photographing have been cleared at the step S104, and hence the face position information and the face size information are not obtained. If it is determined in the step S261 that the face position information and the face size information are obtained, the process proceeds to step S262.

In the step S262, the control unit 41 calculates an object distance to subject, Df, based on the face size information detected by the signal processing circuit 43 and focal distance information on the taking lens obtained by the lens control unit 51. Assuming that the focal distance information on the taking lens is represented by FL, the detected face size information is represented by Wf, and a conversion coefficient determined by an actual human's face size, etc. is represented by K1, the object distance Df is calculated according to the following formula.

$$Df = FL \times K1 \div Wf$$

The actual size of human face naturally varies according to age and has an individual difference. On the other hand, according to human body size data collection for design provided by National Institute of Bioscience and Human-Technology, an average head width of Japanese people is 162 mm. On the other hand, according to Humanscale published by the MIT Press, an average head width of American people (men) is 155 mm. As understood from these statistics information, the conversion coefficient K1 can be determined on an assumption that the actual size (width) of human's face varies from 150 to 160 mm.

If a size represented by the face size information is lower than a predetermined value, there is a fear that the detection accuracy is low. If the size represented by the face size information is larger than the predetermined value and the position represented by the face position information is located at periphery of the imaging screen, there is a possibility that the face extends of f the imaging screen and the face size information has a large error. In that case, the object distance Df is not calculated, but set to a value of 0, for example.

Next, in step S263, the control unit 41 calculates, in accordance with the following formula, a ratio DS between the distance information D measured by the distance encoder 56 and acquired from the lens control unit 51 and the object distance Df calculated in the step S262.

$$DS = D \div Df$$

In a case that a relation of Df=0 stands, the above calculation cannot be carried out and therefore the ratio DS is set to a fixed value, which is equal to or larger than a predetermined value, e.g., 255.

Next, in step S264, the control unit 41 checks whether or not the ratio DS has a value equal to or less than a predetermined value. When the ratio DS falls within a range, e.g., from 0.9 to 1.1, it is determined that the ratio DS is equal to or less than the predetermined value. In that case, the distance information D measured by the distance encoder 56 coincides with the object distance Df calculated from the face size information, with the accuracy having an error of 10% or less. If the value of the ratio DS is equal to or less than the predetermined value, it is considered that the distance to subject represented by the distance information D has an extremely small error relative to the actual distance to subject (photographing distance), and the process proceeds to step S265.

In the step S265, the control unit 41 calculates, in accordance with the following formula, a correction value DC for the amount of reflection light determined based on the distance information D.

DC=(LVL2−AVE)×0.7, where LVL2 represents the reference reflection light amount calculated in step S260 from the distance information D, and AVE represents the weighted average value of reflection light amounts for all the light metering areas at preliminary light emission calculated in step S258.

If it is determined at the step S264 that the value of the ratio DS is not equal to nor less than the predetermined value, the control unit 41 recognizes that the distance information D includes a certain error relative to the actual photographing distance to subject, and proceeds to step S266. If it is determined at the step S261 that the face position information and the face size information are not obtained, a determination cannot be made as to whether the distance information D has a small error or a large error relative to the actual distance to subject. In that case, the control unit 41 assumes that the distance information D includes a certain error, and proceeds to step S266.

In the step S266, in accordance with the following formula, the control unit 41 calculates a correction value DC for the amount of reflection light determined based on the distance information D.

DC=(LVL2−AVE)×0.3, where LVL2 represents the reference reflection light amount calculated in the step S260 from the distance information D, and AVE represents the weighted average value of reflection light amounts for all the light metering areas at preliminary light emission calculated in the step S258.

If the lens unit 2 is not equipped with the distance encoder 56 and if it is determined at the step S259 that the distanceto-subject information, i.e., the distance information D from the distance encoder 56, is not obtained, the process proceeds to step S267. In the step S267, the control unit 41 sets the correction value DC to 0 since the correction value DC for the amount of reflection light cannot be calculated based on the distance-to-subject information D.

After completion of the processing in any of the steps S265 to S267, the process proceeds to step S268. In the step S268, the control unit 41 calculates an emission amount G at main emission in accordance with the following formula based on the exposure value EVT decided in step S108 or S112, the weighted average value of reflection light amounts, AVE, calculated in step S258, and the correction value DC calculated in any of steps S265 to S267.

$$G = EVT - AVE - DC$$

The emission amount G is a value of main emission amount relative to an flash-emission amount at preliminary light emission of the emission device 34.

If the process proceeds from step S265 to step S268, the correction amount DC is made equal to 70% of the difference between the reference reflection light amount LVL2 calculated from the distance-to-subject information D and the weighted average value AVE of reflection light amounts for all the light metering areas at preliminary light emission. This is a case where the distance information D from the distance encoder 56, i.e., distance-to-subject information, is determined to be considerably accurate. Thus, 70% of the amount of main flash, G, depends on the reference reflection light amount LVL2 calculated from the distance information D, and the remaining 30% thereof depends on the weighted average value AVE of reflection light amounts for all the light metering areas at preliminary light emission. In other words, the amount of main flash, G, is decided while assigning a weight of 70% to the distance information D from the distance encoder 56.

If the process proceeds from step S266 to step S268, the correction amount DC is made equal to 30% of the difference between the reference reflection light amount LVL2 calculated from distance-to-subject information D and the weighted average value AVE of reflection light amounts for all the light metering areas at preliminary light emission. This is a case where the distance information D from the distance encoder 56, i.e., distance-to-subject information, is determined as including a certain error. Thus, 30% of the amount of main flash G depends on the reference reflection light amount LVL2 calculated from distance information D, and 70% thereof depends on the weighted average value AVE of reflection light amounts for all the light metering areas at preliminary light emission. Thus, the amount of main flash G is determined while assigning a weight of 70% to the weighted average value AVE of reflection light amounts for all the light metering areas at preliminary light emission.

If the process proceeds from step S267 to step S268, the distance information D from the distance encoder 56, i.e., distance-to-subject information, is not present, the correction value DC for reflection light amount based on the distance-to-subject information D is set to 0. Thus, the amount of main flash, G, is decided while assigning a weight of 100% to the weighted average value AVE of reflection light amounts for all the light metering areas at preliminary light emission.

The value of amount of main flash G is delivered by communication from the control unit 41 of the camera body 1 to the control unit 61 of the flash unit 3, and the main emission is performed by the emission device 34 in step S120 based on the amount of main flash, whereby the desired flash image pickup is carried out.

In the above, the example percentage by which the amount of main flash G depends on the reference reflection light amount LVL2 calculated from the distance information D when the process proceeds from step S265 to step S268 is shown, and the example percentage by which the amount of main flash G depends on the weighted average value AVE of reflection light amounts for all the light metering areas at preliminary light emission when the process proceeds from step S266 to step S268 is also shown, but these percentages are not limitative. For example, the percentage by which the amount of main flash G depends on the reference reflection light amount LVL2 calculated from the distance information D may be 100% when it is determined that the distance information D from the distance encoder 56 as the distance-to-subject information is considerably accurate. The percentage by which the amount of main flash G depends on the weighted average value AVE of reflection light amounts for all the light metering areas at preliminary light emission may be 100% when it is determined that the distance information D from the distance encoder 56 as the distance-to-subject information is not accurate.

In determining at step S264 the accuracy of the distance information D from the distance encoder 56, a plurality of reference values may be used to more finely determine the accuracy of the distance information D from the distance encoder 56, and the percentage by which the amount of main flash G depends on the reference reflection light amount LVL2 calculated from the distance information D may be made larger with the increase in accuracy of the distance information D.

In steps S265 and S266, the amount of main flash G is calculated after calculation of the correction value DC. Alternatively, amounts of main flash based on respective ones of the distance information D from the distance encoder 56 and the weighted average value AVE may be first calculated, and then it may be decided how much they should be reflected on the actual amount of main flash (the degrees of weighting of these calculated amounts of main flash in the calculation of the actual amount of main flash).

As described above, the following effects can be attained by this embodiment. In a case it is possible to determine that the absolute distance-to-subject information obtained from a result of camera focus adjustment has a small error, an amount of emission of the flash unit 3 is decided by giving a large weight to the distance information, whereby a satisfactory exposure not dependent on the reflectance of the subject can be obtained. On the other hand, in a case it is possible to determine that the absolute distance-to-subject information obtained from a result of focus adjustment has a large error, an amount of emission of the flash unit 3 is decided by giving a large weight to light metering values at preliminary light emission, whereby a stable exposure can be attained while reducing influences by an error in the amount of emission due to an error in distance-to-subject information.

It should be noted that the contents of the first and second embodiments may be applied to the third embodiment.

Other Embodiment

In the first to third embodiments, a case has been described where the face position information and the face size information are used as the face information, but this is not limitative. This invention is also applicable to a case where only the face position information is used as the face information.

Further, the lens unit and the flash unit may be incorporated in the camera body.

It is to be understood that the present invention may also be accomplished by supplying a system or an apparatus with a storage medium in which a program code of software, which realizes the functions of the above described embodiments is stored and by causing a computer (or CPU or MPU) of the system or apparatus to read out and execute the program code stored in the storage medium.

In that case, the program code itself read from the storage medium realizes the functions of the above described embodiments, and therefore the program code and the storage medium in which the program code is stored constitute the present invention.

Examples of the storage medium for supplying the program code include a floppy (registered trademark) disk, a hard disk, and a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2008-092364 and 2008-092366, filed Mar. 31, 2008, which are hereby incorporated by reference herein in their entirety.

What is claimed is:

1. An image pickup apparatus capable of executing photographing using an emission unit that emits light to a subject, comprising:
an acquisition unit adapted to obtain distance-to-subject information based on lens driving information on a taking lens obtained upon focus adjustment;
a detection unit adapted to detect a face of the subject based on an image signal obtained upon image pickup;
a distance calculation unit adapted to calculate a distance to subject based on a result of detection by said detection unit; and
an emission amount calculation unit adapted to calculate an amount of main emission of the emission unit based on the distance-to-subject information obtained by said acquisition unit and the distance to subject calculated by said distance calculation unit.

2. The image pickup apparatus according to claim 1, wherein said emission amount calculation unit compares a distance to subject based on the distance-to-subject information obtained by said acquisition unit with the distance to subject calculated by said distance calculation unit, and alters the amount of main emission of the emission unit in accordance with a result of comparison therebetween.

3. The image pickup apparatus according to claim 1, wherein said distance calculation unit calculates the distance to subject in accordance with focal distance information and face information based on a result of detection by said detection unit.

4. The image pickup apparatus according to claim 3, wherein the face information is face size information indicating a size of a human face which is the subject in an imaging screen of the image pickup apparatus.

5. The image pickup apparatus according to claim 1, further including:
a light metering unit adapted to photometrically measure brightness of the subject,
wherein said emission amount calculation unit calculates the amount of main emission of the emission unit by using at least one of the brightness of the subject photometrically measured by said light metering unit during a preliminary emission operation of the emission unit and standard brightness set based on the distance information obtained by said acquisition unit, and alters a degree of weighting of the standard brightness in calculating the amount of main emission of the emission unit in accordance with the distance to subject calculated by said distance calculation unit and a distance to subject based on the distance information obtained by said acquisition unit.

6. The image pickup apparatus according to claim 1, further including:
a light metering unit adapted to photometrically measure brightness of the subject,
wherein said emission amount calculation unit calculates the amount of main emission of the emission unit in accordance with at least one of a first emission amount based on the brightness of the subject photometrically measured by said light metering unit during a preliminary emission operation of the emission unit and a second emission amount based on the distance-to-subject information obtained by said acquisition unit, and
said emission amount calculation unit alters, based on the distance-to-subject information obtained by said acquisition unit and the distance to subject calculated by said distance calculation unit, degrees of weighting of the first and second emission amounts in calculating the amount of main emission of the emission unit.

7. The image pickup apparatus according to claim 6, wherein said emission amount calculation unit makes the degree of weighting of the second emission amount greater as a distance to subject based on the distance information obtained by said acquisition unit is closer to the distance to subject calculated by said distance calculation unit.

8. The image pickup apparatus according to claim 6, wherein in a case where a ratio between a distance to subject based on the distance information obtained by said acquisition unit and the distance to subject calculated by said distance calculation unit falls within a predetermined range, said emission amount calculation unit makes the degree of weighting of the second emission amount greater than that in a case where the ratio falls outside the predetermined range.

9. The image pickup apparatus according to claim 8, wherein in a case where the face information is not obtained by said detection unit, said emission amount calculation unit makes the degree of weighing of the second emission amount smaller than that in a case where the ration between the distance to subject based on the distance information obtained by said acquisition unit and the distance to subject calculated by said distance calculation unit falls within the predetermined range.

10. The image pickup apparatus according to claim 6, wherein said light metering unit has a plurality of divided light metering regions and is adapted to photometrically measure brightness of the subject for each of the light metering regions, and wherein the image pickup apparatus further includes:

a brightness ratio calculation unit adapted to calculate, for each light metering region, a ratio between first brightness photometrically measured by said light metering unit before a preliminary emission operation of the emission unit and second brightness photometrically measured by said light metering unit during the preliminary emission operation of the emission unit;

an extraction unit adapted to extract a value of a reference ratio from ratios calculated by said brightness ratio calculation unit for the light metering regions; and a weighted calculation unit adapted to calculate a weighted average value of brightnesses photometrically measured by said light metering unit for the light metering regions based on results of comparison between the value of the reference ratio extracted by said extraction unit and each of values of ratios calculated by said brightness ratio calculation unit for the light metering regions, and wherein the first emission amount used by said emission amount calculation unit to calculate the amount of main emission of the emission unit is based on the weighted average value calculated by said weighted calculation unit.

11. The image pickup apparatus according to claim 10, further including:

a setting unit adapted to set, based on a result of detection by said detection unit, object light metering regions from which the value of the reference ratio is to be extracted by said extraction unit.

12. The image pickup apparatus according to claim 11, wherein said setting unit sets the object light metering regions from which the value of the reference ratio is to be extracted by said extraction unit based on face information obtained based on the result of detection by said detection unit.

13. The image pickup apparatus according to claim 12, wherein in a case where the face information is not obtained, said setting unit sets predetermined light metering regions as the object light metering regions.

14. The image pickup apparatus according to claim 12, wherein said setting unit selects, based on the face information, desired object light metering regions from an object light metering region table in which a plurality of object light metering regions are set in advance.

15. The image pickup apparatus according to claim 12, wherein the face information is at least one of face size information indicating a size of a human face which is the subject in an imaging screen of the image pickup apparatus and face position information indicating a position of the human face.

16. An image pickup apparatus capable of executing photographing using an emission unit that emits light to a subject, comprising:

a light metering unit having a plurality of divided light metering regions and adapted to photometrically measure subject brightness for each of the light metering regions;

a detection unit adapted to detect a face of the subject based on an image signal obtained upon image pickup;

a brightness ratio calculation unit adapted to calculate, for each of the light metering regions, a ratio between first brightness photometrically measured by said light metering unit before a preliminary emission operation of the emission unit and second brightness photometrically measured by said light metering unit during the preliminary emission operation of the emission unit;

an extraction unit adapted to extract a value of a reference ratio from ratios calculated by said brightness ratio calculation unit for the light metering regions;

a setting unit adapted to set, based on a result of detection by said detection unit, object light metering regions from which the value of the reference ratio is to be extracted by said extraction unit;

a weighted calculation unit adapted to calculate a weighted average value of brightnesses photometrically measured by said light metering unit for the light metering regions based on results of comparison between the value of the reference ratio extracted by said extraction unit and each of values of ratios calculated by said brightness ratio calculation unit for the light metering regions; and an emission amount calculation unit adapted to calculate an amount of main emission of the emission unit based on the weighted average value calculated by said weighted calculation unit.

17. A camera system capable of executing strobe photographing, comprising:

a lens unit;

an emission unit adapted to emit light to a subject;

an acquisition unit adapted to obtain distance-to-subject information based on lens driving information on a taking lens obtained upon focus adjustment of said lens unit;

a detection unit adapted to detect a face of the subject based on an image signal obtained upon image pickup;

a distance calculation unit adapted to calculate a distance to subject based on a result of detection by said detection unit; and an emission amount calculation unit adapted to calculate an amount of main emission of the emission unit based on the distance-to-subject information obtained by said acquisition unit and the distance to subject calculated by said distance calculation unit.

18. A camera system capable of executing strobe photographing, comprising:

an emission unit adapted to emit light to a subject;

a light metering unit having a plurality of divided light metering regions and adapted to photometrically measure brightness of the subject for each of the light metering regions;

a detection unit adapted to detect a face of the subject based on an image signal obtained upon image pickup;

a brightness ratio calculation unit adapted to calculate, for each light metering region, a ratio between first brightness photometrically measured by said light metering unit before a preliminary emission operation of the emission unit and second brightness photometrically measured by said light metering unit during the preliminary emission operation of the emission unit;

an extraction unit adapted to extract a value of a reference ratio from ratios calculated by said brightness ratio calculation unit for the light metering regions;

a setting unit adapted to set, based on a result of detection by said detection unit, object light metering regions from which the value of the reference ratio is to be extracted by said extraction unit;

a weighted calculation unit adapted to calculate a weighted average value of brightnesses photometrically measured by said light metering unit for the light metering regions based on results of comparison between the value of the reference ratio extracted by said extraction unit and each of values of ratios calculated by said brightness ratio calculation unit for the light metering regions; and an emission amount calculation unit adapted to calculate an amount of main emission of the emission unit based on the weighted average value calculated by said weighted calculation unit.

19. A control method for an image pickup apparatus capable of executing photographing using an emission unit that emits light to a subject, comprising:

an acquisition step of obtaining distance-to-subject information based on lens driving information on a taking lens obtained upon focus adjustment;

a detection step of detecting a face of the subject based on an image signal obtained upon image pickup;

a distance calculation step of calculating a distance to subject based on a result of detection in said detection step; and an emission amount calculation step of calculating an amount of main emission of the emission unit based on the distance-to-subject information obtained in said acquisition step and the distance to subject calculated in said distance calculation step.

20. A control method for an image pickup apparatus capable of executing photographing using an emission unit that emits light to a subject, comprising:

a light metering step of photometrically measuring subject brightness for each of a plurality of divided light metering regions;

a detection step of detecting a face of the subject based on an image signal obtained upon image pickup;

a brightness ratio calculation step of calculating, for each of the light metering regions, a ratio between first brightness photometrically measured in said light metering step before a preliminary emission operation of the emission unit and second brightness photometrically measured in said light metering step during the preliminary emission operation of the emission unit;

an extraction step of extracting a value of a reference ratio from ratios calculated in said brightness ratio calculation step for the light metering regions;

a setting step of setting, based on a result of detection in said detection step, object light metering regions from which a value of the reference ratio is to be extracted in said extraction step;

a weighted calculation step of calculating a weighted average value of brightnesses photometrically measured in said light metering step for the light metering regions based on results of comparison between the value of the reference ratio extracted in said extraction step and each of values of ratios calculated in said brightness ratio calculation step for the light metering regions; and an emission amount calculation step of calculating an amount of main emission of the emission unit based on the weighted average value calculated in said weighted calculation step.

* * * * *